(12) United States Patent
Vasilev et al.

(10) Patent No.: US 7,526,734 B2
(45) Date of Patent: Apr. 28, 2009

(54) USER INTERFACES FOR DEVELOPING ENTERPRISE APPLICATIONS

(75) Inventors: Vasil G. Vasilev, Sofia (BG); Dimiter G. Dimitrov, Sofia (BG)

(73) Assignee: SAP AG, Walldorf (DE)

( * ) Notice: Subject to any disclaimer, the term of this patent is extended or adjusted under 35 U.S.C. 154(b) by 611 days.

(21) Appl. No.: 10/836,906

(22) Filed: Apr. 30, 2004

(65) Prior Publication Data

US 2005/0246656 A1  Nov. 3, 2005

(51) Int. Cl.
*G06F 3/048* (2006.01)
*G06F 9/44* (2006.01)

(52) U.S. Cl. .............. 715/805; 717/102; 717/103; 717/121

(58) Field of Classification Search .......... 717/102, 717/100, 116, 120, 121, 101, 103; 715/805
See application file for complete search history.

(56) References Cited

U.S. PATENT DOCUMENTS

| | | | | |
|---|---|---|---|---|
| 5,806,062 A * | 9/1998 | Chen et al. | ...... | 707/4 |
| 5,850,548 A * | 12/1998 | Williams | ...... | 717/107 |
| 5,859,977 A * | 1/1999 | Nishiyama et al. | ...... | 709/223 |
| 5,953,525 A * | 9/1999 | Glaser et al. | ...... | 717/105 |
| 6,067,477 A * | 5/2000 | Wewalaarachchi et al. | ...... | 700/83 |
| 6,256,676 B1 | 7/2001 | Taylor et al. | ...... | 709/246 |
| 6,275,977 B1 * | 8/2001 | Nagai et al. | ...... | 717/104 |
| 6,332,218 B1 * | 12/2001 | Walker et al. | ...... | 717/166 |
| 6,339,841 B1 * | 1/2002 | Merrick et al. | ...... | 717/166 |
| 6,502,234 B1 * | 12/2002 | Gauthier et al. | ...... | 717/107 |
| 6,529,948 B1 * | 3/2003 | Bowman-Amuah | ...... | 709/217 |
| 6,681,391 B1 * | 1/2004 | Marino et al. | ...... | 717/175 |
| 6,684,387 B1 * | 1/2004 | Acker et al. | ...... | 717/126 |
| 6,687,902 B1 * | 2/2004 | Curtis et al. | ...... | 717/175 |
| 6,725,453 B1 * | 4/2004 | Lucas et al. | ...... | 717/178 |
| 6,804,686 B1 * | 10/2004 | Stone et al. | ...... | 707/104.1 |
| 6,842,856 B2 * | 1/2005 | Shenassa et al. | ...... | 713/1 |
| 7,055,130 B2 * | 5/2006 | Charisius et al. | ...... | 717/108 |
| 7,055,131 B2 * | 5/2006 | Charisius et al. | ...... | 717/109 |
| 7,171,646 B2 * | 1/2007 | Charisius et al. | ...... | 717/100 |
| 2002/0087734 A1 * | 7/2002 | Marshall et al. | ...... | 709/310 |
| 2002/0103973 A1 * | 8/2002 | Zimniewicz et al. | ...... | 711/119 |
| 2002/0104071 A1 * | 8/2002 | Charisius et al. | ...... | 717/109 |
| 2002/0116698 A1 * | 8/2002 | Lurie et al. | ...... | 717/100 |
| 2002/0120917 A1 * | 8/2002 | Abrari et al. | ...... | 717/110 |
| 2002/0129177 A1 * | 9/2002 | McGuire et al. | ...... | 709/315 |
| 2002/0129346 A1 * | 9/2002 | Lee et al. | ...... | 717/163 |
| 2002/0138571 A1 * | 9/2002 | Trinon et al. | ...... | 709/204 |
| 2002/0194398 A1 * | 12/2002 | Bentley et al. | ...... | 709/331 |
| 2003/0046681 A1 * | 3/2003 | Barturen et al. | ...... | 717/177 |
| 2003/0051236 A1 * | 3/2003 | Pace et al. | ...... | 717/177 |
| 2003/0056029 A1 * | 3/2003 | Huang et al. | ...... | 709/328 |

(Continued)

*Primary Examiner*—Adam L Basehoar
*Assistant Examiner*—William Wong
(74) *Attorney, Agent, or Firm*—Blakely Sokoloff Taylor & Zafman LLP

(57) ABSTRACT

Methods and apparatuses for providing a user interface for editing and deploying an enterprise application are described herein. In one embodiment, an exemplary user interface includes, but not limited to, a first window to display a graphical representation of a first component, a second window to display one or more properties associated with the first component when the graphical representation is activated, and wherein the one or more properties include a reference field to display a dependency relationship with a second component, the dependency relationship including an indication indicating strength of the dependency relationship. Other methods and apparatuses are also described.

28 Claims, 15 Drawing Sheets

U.S. PATENT DOCUMENTS

| | | | |
|---|---|---|---|
| 2003/0105993 A1* | 6/2003 | Colrain et al. | 714/39 |
| 2003/0110253 A1* | 6/2003 | Anuszczyk et al. | 709/224 |
| 2003/0122867 A1* | 7/2003 | Choi et al. | 345/748 |
| 2003/0126584 A1* | 7/2003 | Creamer et al. | 717/109 |
| 2003/0187821 A1* | 10/2003 | Cotton et al. | 707/1 |
| 2003/0200350 A1* | 10/2003 | Kumar et al. | 709/315 |
| 2003/0204644 A1* | 10/2003 | Vincent | 709/317 |
| 2004/0015936 A1* | 1/2004 | Susarla et al. | 717/166 |
| 2004/0031015 A1* | 2/2004 | Ben-Romdhane et al. | 717/107 |
| 2004/0093593 A1* | 5/2004 | Jhanwar et al. | 717/169 |
| 2004/0143830 A1* | 7/2004 | Gupton et al. | 717/174 |
| 2004/0168152 A1* | 8/2004 | Kramer | 717/120 |
| 2004/0187096 A1* | 9/2004 | Dumont | 717/120 |
| 2004/0226029 A1* | 11/2004 | Gelme | 719/328 |
| 2004/0255294 A1* | 12/2004 | Spotwood | 717/176 |
| 2004/0261060 A1* | 12/2004 | Haselden et al. | 717/120 |
| 2005/0091347 A1* | 4/2005 | Schmitt et al. | 709/220 |
| 2005/0235248 A1* | 10/2005 | Victoria et al. | 717/102 |
| 2005/0240795 A1* | 10/2005 | Paller et al. | 714/1 |
| 2007/0162903 A1* | 7/2007 | Babb et al. | 717/154 |
| 2007/0169103 A1* | 7/2007 | Bhatkhande et al. | 717/170 |

* cited by examiner

USER INTERFACES FOR DEVELOPING ENTERPRISE APPLICATIONS

COPYRIGHT NOTICES

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to the field of enterprise applications. More particularly, this invention relates to user interfaces for developing enterprise applications.

BACKGROUND OF THE INVENTION

Objected oriented enterprise application development technology, such as, Java®2 Enterprise Edition (J2EE®) or Microsoft®. NET framework, is a technology commonly used in software development today. Generally, the objected oriented development technology reduces the costs and complexity associated with developing multi-tier enterprise services. Another advantage of the objected oriented development technology is that it can be relatively rapidly deployed and enhanced as the need arises. The objected oriented development technology is currently used in many large-scale application development projects for these reasons.

Typically, an enterprise application contains multiple components including one or more server components. Because of the nature of the objected oriented computing environment, the server components may be deployed or undeployed individually. However, there has been a lack of a user friendly graphical user interface (GUI) that supports a developer to define packaging and specific descriptions for the server components, such as libraries, interfaces, and services.

SUMMARY OF THE INVENTION

Methods and apparatuses for providing a user interface for deploying an enterprise application are described herein. In one embodiment, an exemplary user interface includes, but not limited to, a first window to display a graphical representation of a first component, a second window to display one or more properties associated with the first component when the graphical representation is activated, and wherein the one or more properties include a reference field to display a dependency relationship with a second component, the dependency relationship including an indication indicating strength of the dependency relationship. Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
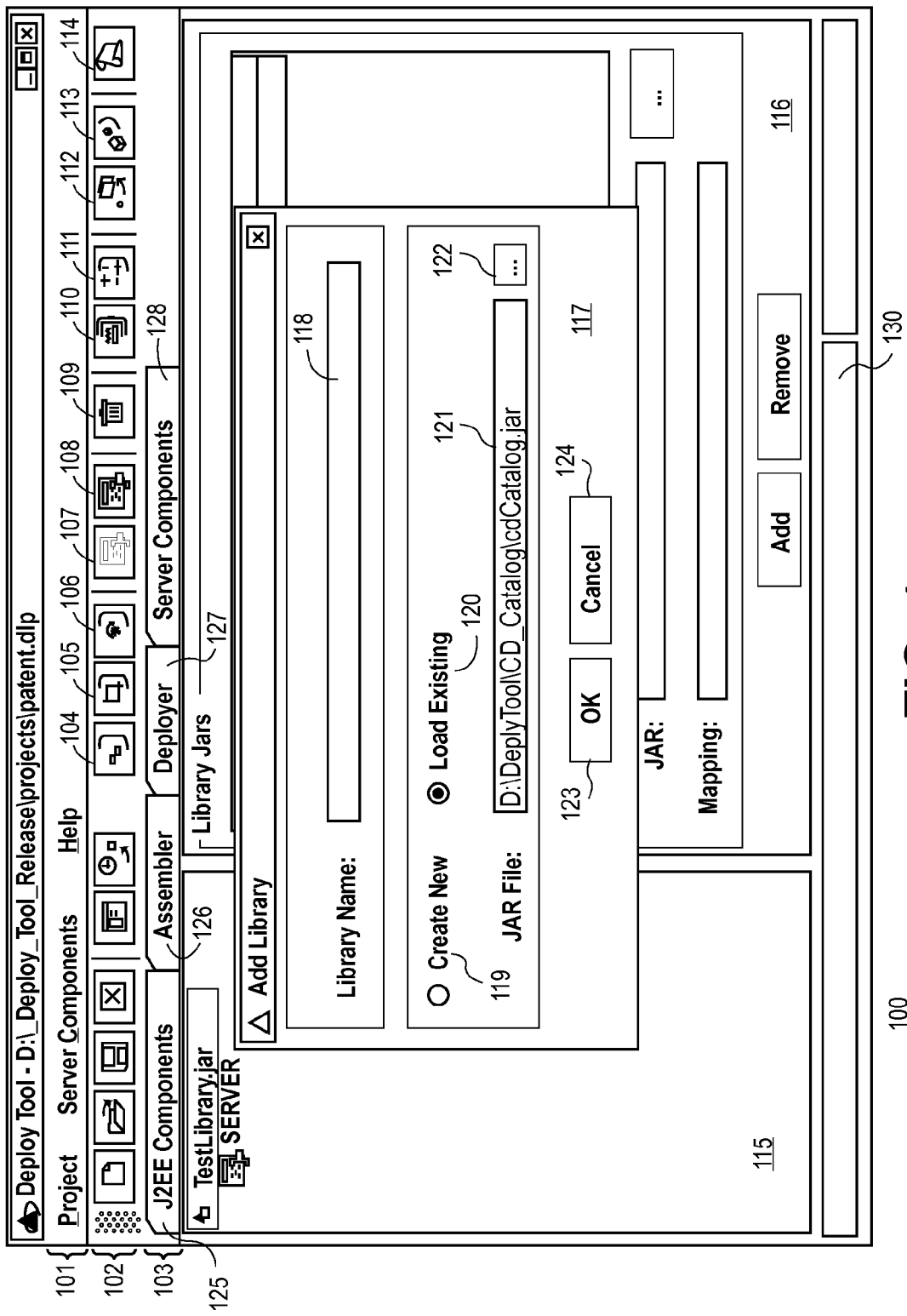
FIG. 1 is block diagram illustrating an exemplary graphical user interface (GUI) for importing enterprise components, according to one embodiment of the invention.

Methods and apparatuses for providing a user interface for deploying an enterprise application are described herein. In one embodiment, a user interface is provided to allow a user to generate a new enterprise component, such as, a library, an interface, and/or a service from the user's own package file and fill in the description data associated with the component in a visual environment. Alternatively, the user interface can be used to load, edit, deploy, and/or remove (e.g., undeploy) an existing enterprise component.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, compact disc read-only memories (CD-ROMs), and magnetic-optical disks, read-only memories(ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Exemplary Deployment User Interface

FIG. 1 is block diagram illustrating an exemplary graphical user interface (GUI) for deploying enterprise components, according to one embodiment of the invention. In one embodiment, the exemplary GUI 100 may be a part of a deployment utility for deploying enterprise applications. Alternatively, the exemplary GUI 100 may be integrated into an integrated development environment (IDE) for developing enterprise applications, such as, for example, the NetWeaver® developer studio from SAP AG, JAVA® development kit (JDK®) from SUN MICROSYSTEMS, or MICROSOFT®.NET development studio (e.g., C#® visual development studio, Visual Basic.NET®, and/or ASP-.NET®)from MICROSOFT Corporation.

Referring to FIG. 1, exemplary GUI 100 includes, but not limited to, a menu bar 101 having one or more pull-down menus including one or more selectable items, a tool bar 102 having one or more buttons or controls, and page selector area 103 having one or more page selectors to display one or more pages within the exemplary GUI 100. In one embodiment, the menu bar 101 includes a project menu that includes one or more items to manage an enterprise project.

In one embodiment, the tool bar 102 includes, but not limited to, an add library button 104, an add interface button 105, an add service button 106, an add server button 107, an add dispatcher button 108, a remove button 109, an archive button 110, an archive-all button 111, a deploy button 112, a undeploy button 113, and a log viewer button 114. The buttons listed in the tool bar 102, when activated, may perform one or more specific functions. The tool bar 102 may be user configurable at runtime. For example, one or more buttons or controls may be added to or removed from the tool bar 102.

In one embodiment, the buttons 104-106 may be used to add a library, an interface, and/or a service into a project respectively. The buttons 107 and 108 may be used to add a server or a dispatcher respectively. The remove button 109 may be used to remove one or more components from the project. The archive button 110 may be used to archive an individual component into an archive file (e.g., *.ear or *.war file), while the archive-all button 111 may be used to archive all of the components into one or more archive files. The deploy button 112 may be used to deploy a component, while the undeploy button 113 may be used to undeploy a deployed component. The log viewer button 114 may be used to display the logging information for some or all of the components that have been editing or/and deployed. Log file may be used to store records for many actions with server components from editing and deployment. Although the above functionality may be performed when the corresponding buttons or controls are activated, it will be appreciated that the above functionality may also be performed by selecting one or more corresponding items from a pull-down menu from the menu bar 101, such as, for example, those shown in FIG. 6. Other buttons or controls may be included in the tool bar 102.

According to one embodiment, the page selector (also referred to as tab) area 103 includes an enterprise component tab 125, an assembler tab 126, a deployer tab 127, and a server component tab 128. In a JAVA development environment, the enterprise component tab 125 may be implemented as a J2EE component tab. For the purposes of illustrations, the present application is illustrated in view of a JAVA development environment. However, it will be appreciated that other enterprise development environments, such as, for example, the .NET framework development environment, may be applied without departing from the broader spirit and scope of embodiments of the invention.

In one embodiment, the enterprise component tab 125 may be used to provide functionality to make archive files out of the enterprise components. In a JAVA development environment, the tab 125 may be used to create EJB (enterprise JAVA bean) JAR (JAVA application archives) files, Web archives (WAR), application client JAR files, and/or resource adapter archives (RAR), etc.

In one embodiment, the assembler tab 126 may be used to provide functionality to combine or package JAR, WAR, client archive JAR files, and RAR files in an enterprise application. In one embodiment, a user or developer may modify the deployment descriptors from original J2EE® archive files and generate the EAR (enterprise application archives) application file. An alternative deployment descriptor, which may be in an XML format, is created for each archive file. These files store the information necessary to visualize the deployment properties in the assembler tab 126. The changes of the deployment properties are stored in alternative deployment descriptors.

In one embodiment, deployer tab 127 may be used to provide functionality to specify the deployment properties and the J2EE® engine-specific properties to deploy an application. In one embodiment, server component tab 128 may be used to provide functionality to specify the deployment properties and assemble and/or deploy services, interfaces, and/or libraries.

Referring back to FIG. 1, when the server component tab 128 is selected, a server component deployment page is displayed. In one embodiment, the server component deployment page includes a first window 115 to display a list of the server components being deployed and a second window 116 to display one or more properties of one of the server components displayed in window 115. The server components may be libraries, interfaces, or services of a server or a dispatcher, which will be described in details further below.

Each of the server components (e.g., library, interface, and service) may be associated with an archive file (e.g., *.jar) and an initialization file or configuration file (e.g., an XML file). One or more server components may be added to or removed from a deployment project.

The exemplary GUI 100 is illustrated for illustrations purposes only. The functionality and the layout of the GUI may vary. For example, the tool bar 102 and/or the page selectors 103 may be implemented at different locations of the GUI, such as, for example, at the bottom of the GUI near the status bar 130. The number of the buttons or controls associated with the tool bar 103 and the page selectors 103 may vary. The buttons, the fields, the page selectors, and/or other controls may be activated via a variety of manners. For example, those buttons, icons, controls, and page selectors, etc., may be activated through one or more keys from a keyboard and/or a pointing device (e.g., a mouse). It will be appreciated that they can also be activated via other methods apparent to those with ordinary skill in the art, such as, for example, a voice interactive command, a stylus, or a command received over a network, such as a VPN (virtual private network), etc. It will be appreciated that some well-known user interfaces are not shown in order not to obscure embodiments of the present invention in unnecessary detail.

Exemplary Library Component Processing

In one embodiment, a library component may be added or removed using the exemplary GUI 100 of FIG. 1. For example, a library component may be added by activating the add library button 104. According to one embodiment, when the add library button 104 is activated, a dialog box or a pop-up window 117 is displayed to prompt the user to specify the library being added. The dialog box 117 may also be displayed when the user selects a corresponding item from a pull-down menu, such as the pull-down menu 611 shown in FIG. 6.

In one embodiment, the pop-up window 117 includes a name field 118 to allow a user to specify the name of the library being added. The library being added may be a brand new library created using a create-new option 119. Alternatively, the library being added may be an existing library using a load-existing option 120. In on embodiment, options 119 and 120 may be implemented using one or more radio buttons, such that only one of the options may be selected. Other configurations, such as, a pull-down menu or a combo box may be utilized. In addition, the pop-up window 117 may include an archive file field 121 to specify an archive filename that the library being added is a member. A user may further browse for an archive file using a browse button 122. The operations of the pop-up window 117 may be confirmed by activating an OK button 123 or alternatively, canceled by activating a cancel button 124. Other capability may also be implemented. For example, the pop-up window 117 may further include a search capability that a user may search a specific archive file. Alternatively, an archive file may be dragged and dropped into window 115 from another location.

Figure 2:
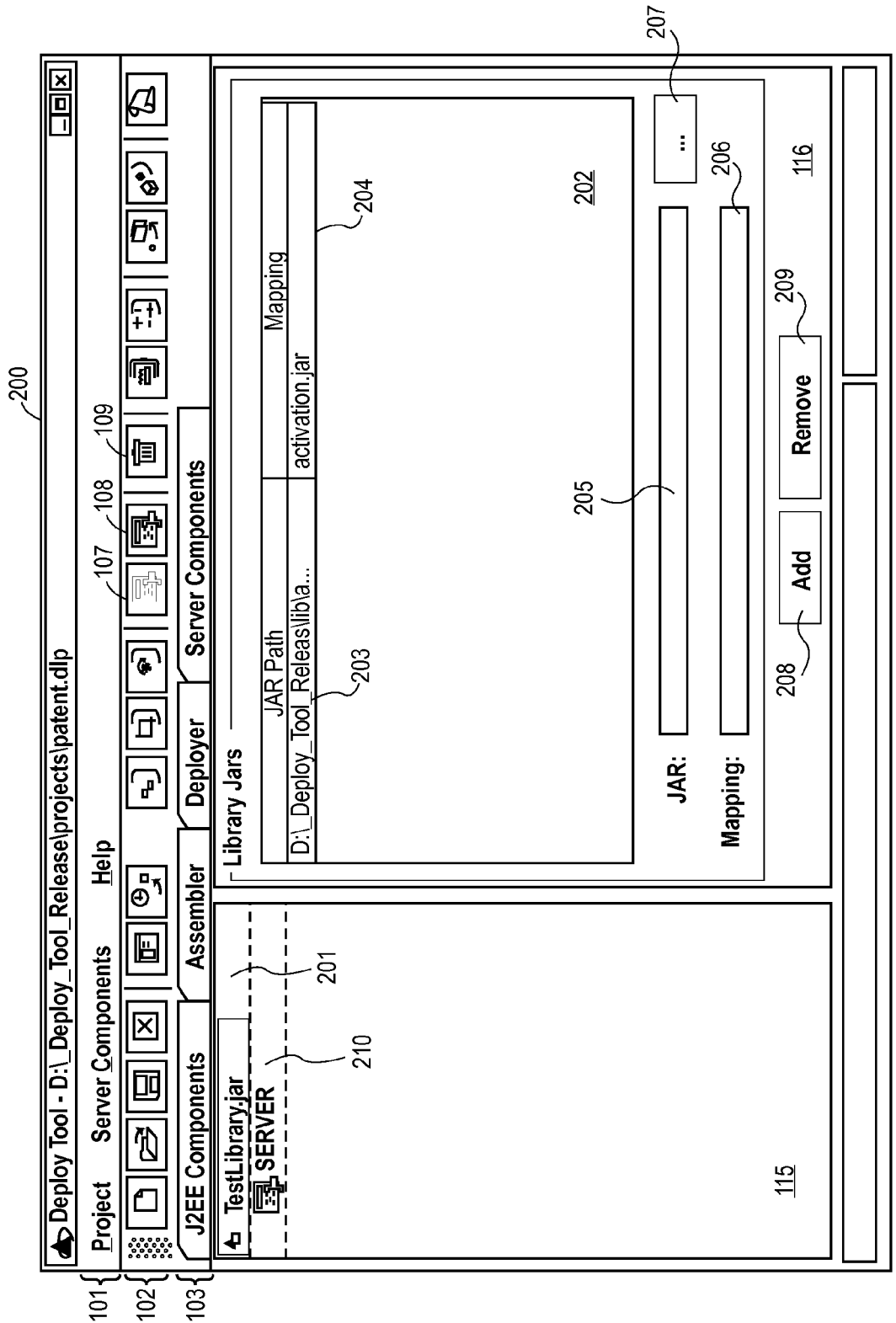
FIGS. 2 and 3 are block diagrams illustrating exemplary GUIs for editing a library component, according to one embodiment of the invention.

Once the OK button 123 is activated, according to one embodiment, the archive file specified in the pop-up window 117 may be displayed in window 115, as shown in FIG. 2. Referring to FIG. 2, similar to FIG. 1, exemplary GUI 200 includes a menu bar 101 having one or more pull-down menus including one or more selectable items, a tool bar 102 having one or more buttons or controls, and page selector area 103 having one or more page selectors to display one or more pages within the exemplary GUI 200. These bars 101-103 may be substantially identical to those shown in FIG. 1. Some reference numbers concerning the members of these bars 101-103 may be omitted, in order to illustrate the features of the exemplary GUI 200 in more details. The omitted reference numbers may be referred to those shown in FIG. 1. Similarly, some of the reference numbers may be maintained as identical to those shown in FIG. 1 for the purposes of consistency.

Referring to FIG. 2, once the OK button 123 of FIG. 1 is activated, a graphical representation of an archive file for one or more library components may be displayed as archive file 201 in window 115. In addition, according to one embodiment, one or more properties associated with the archive file 201 may be displayed in window 116, when the graphical representation of the archive file is activated. Under each library archive file listed in window 115 (e.g., archive file 201), according to one embodiment, one or more server or dispatcher components may be added using add server button 107 or add dispatcher button 108. For example, server component 210 under archive file 201 may be added by activating add server button 107. In one embodiment, after adding/creation of the server component in a deploy project, a server instance is attached.

Alternatively, one or more server or dispatcher components may be removed from an archive file using remove button 109. For example, server component 210 may be removed from archive file 201 by highlighting server component 210 in window 115 and activating remove button 109. Every server component may have cluster node association—server, dispatcher or both. If the instance is only one it cannot be removed. To switch from server to dispatcher (or vice versa) a client has to add appropriate instance first and then remove the redundant one. It will be appreciated that the above actions may also be performed via one or more menu items from a menu, such as, for example, a pull-down menu 611 shown in FIG. 6. Other activation manner, such as, for example, a voice interactive command, one or more keys combination (also referred to as function keys or hot keys), etc., may be utilized.

According to one embodiment, for the purposes of illustrations, when the archive file 201 is selected, one or more properties associated with the archive file 201 may be displayed in window 116. In this example, according to one embodiment, window 116 may include a sub-window 202 to display one or more archive files associated with the archive 201. Window 202 may include an archive path field 203 to specify a path and a location of an archive file and the mapping field 204 to map the archive file specified in the archive path field 203 with an archive name.

In addition, according to one embodiment, one or more archive files may be added to the archive 201, which may be displayed in window 202 when added. The additional archive files may be specified in field 205 and the mapping information may be specified in field 206. A user may also browse for the additional archive file using a browsing button 207. Alternatively, an archive file may be dragged and dropped into window 115 from another location. Once the user has specified an archive file in field 205 and the optional mapping information in field 206, the specified archive file may be added by activating add button 208. The added archive file will be displayed in window 202. Similarly, one or more archive files listed in window 202 may be removed by selecting an archive file in window 202 and activating a remove button 209. Alternatively, one or more items in the window 202 may be removed via a drag-and-drop operation.

Furthermore, according to one embodiment, for each library archive (e.g., archive 201), only one server component and one dispatcher component may be added. As a result after server component 210 has been added, the add server button 107 may be disabled (e.g., grayed out), such that no more server component may be added. However, the add dispatcher button 108 may be still enabled because one more dispatcher component may be added under archive 201. When a server component or a dispatcher component is added, a user is given an opportunity to provide a name for the component being added. For example, a dialog box or a pop-up window, such as, window 117 of FIG. 1, may be used to prompt the user for the name of the component. Without a specific name from the user, a default name may be used. Other options or configurations may be included.

Figure 3:
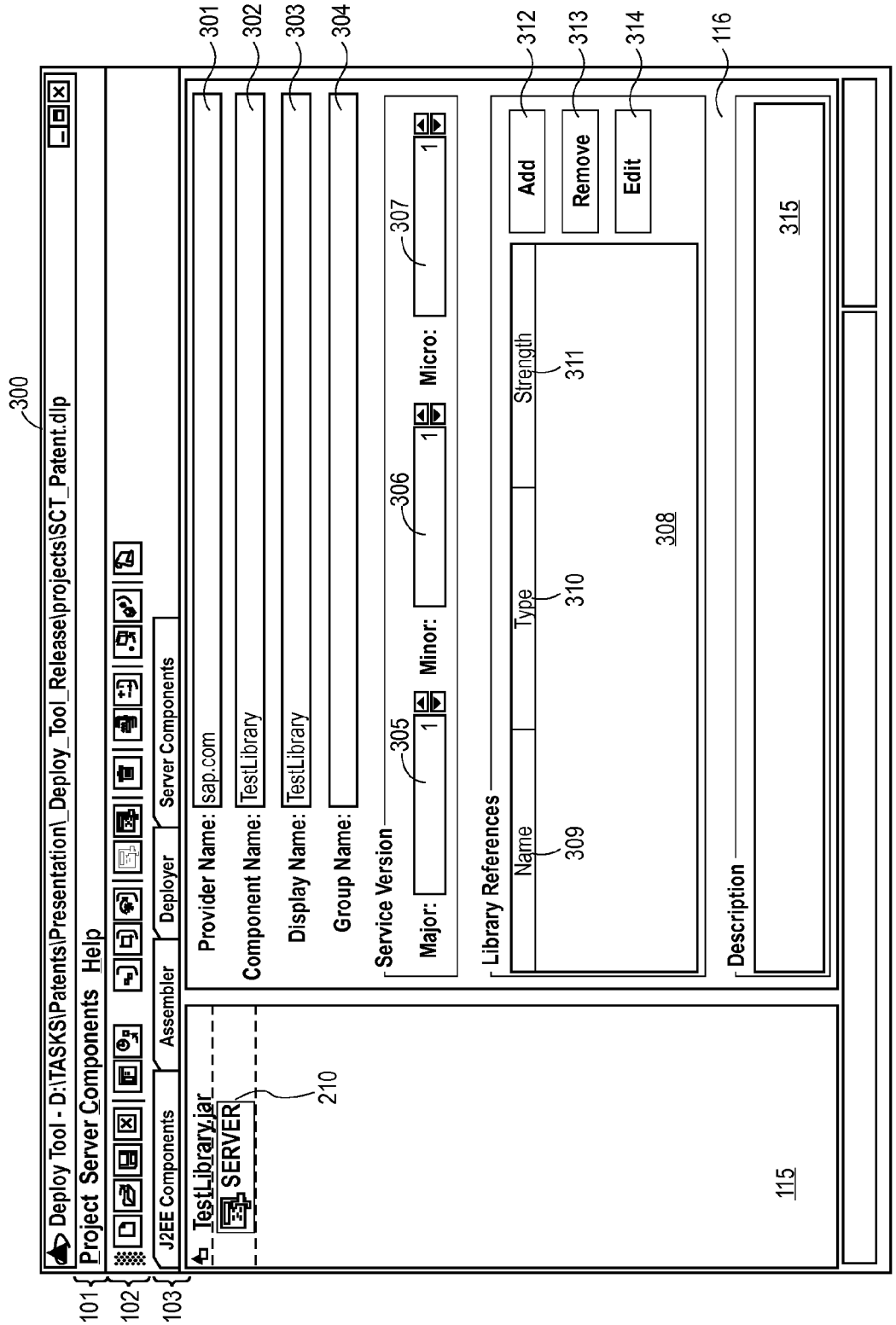

When a user selects a component, such as server component 210 in window 115, according to one embodiment, one or more properties associated with the selected component may be displayed in window 116, where some or all of the properties may be edited, as shown in FIG. 3. Referring to FIG. 3, similar to FIG. 1, exemplary GUI 300 includes a menu bar 101 having one or more pull-down menus including one or more selectable items, a tool bar 102 having one or more buttons or controls, and page selector area 103 having one or more page selectors to display one or more pages within the exemplary GUI 300. These bars 101-103 may be substantially identical to those shown in FIG. 1. Some reference numbers concerning the members of these bars 101-103 may be omitted, in order to illustrate the features of the exemplary GUI 300 in more details. The omitted reference numbers may be referred to those shown in FIG. 1. Similarly, some of the reference numbers may be maintained as identical to those shown in FIGS. 1 and 2 for the purposes of consistency.

For the purposes of illustrations, according to one embodiment, when server component 210 is selected in window 115, one or more properties associated with server component 210 may be displayed in window 116. In one embodiment, the properties displayed in window 116 includes, but not limited to, a provider name field 301, a component name field 302, a display name field 303, and a group name field 304.

In one embodiment, the provider name field 301 may be used to specify a provider of the component, such as, for example, a Web server from a provider (e.g., sap.com). The component name field 302 may be used to specify the name under which the component may be registered in a service container, which will be described in details further below. The display name field 303 may be used to specify a display name that identifies the component and the name of the group that the component is a member of may be specified in a group name field 304.

In addition, the properties displayed in window 116 may further include a service version field. In one embodiment, a major service version may be specified in a major version field 305. A minor service version may be specified in a minor version field 306 and a micro service version may be specified in a micro version field 307. In one embodiment, service version includes three digits, where the first, second, and third digits are corresponding to the major, minor, and micro versions.

Furthermore, according to one embodiment, the properties displayed in window 116 may further include a reference table 308 to specify the component references in the library references and/or interface references. In one embodiment, the reference table 308 includes a name field 309, a type field 310, and a strength field 311. The name field 309 may be used to specify a name of a service, library, or interface, to which the component refers. The type field 310 may be used to specify the type of the reference to another library or interface. In one embodiment, each library may refer to libraries or interfaces and each interface may refer to interfaces only. The strength field 311 may be used to specify the strength of the reference. In one embodiment, the strength of the reference (also referred to as dependency relationship) may include a strong (also referred to as hard), a weak, and a notify references, which will be described in details further below. In one embodiment, the interface and library references may only support a weak reference.

In one embodiment, one or more references may be added using an add reference button 512, removed using a remove reference button 513, and/or edited using an edit reference button 514. Further, a description concerning the component may be edited or displayed in description window 515. It will be appreciated that some well-known user interfaces are not shown herein in order not to obscure embodiments of the present invention in unnecessary detail.

Exemplary Interface Component Processing

In one embodiment, an interface component may be added or removed using the exemplary GUI 100 of FIG. 1. For example, an interface component may be added by activating the add interface button 105 of FIG. 1. According to one embodiment, when the add interface button 105 is activated, a dialog box or a pop-up window, similar to dialog box 117 of FIG. 1, is displayed to prompt the user for the interface being added. The dialog box may also be displayed when the user selects a corresponding item from a pull-down menu, such as the pull-down menu 611 shown in FIG. 6.

In one embodiment, the pop-up window may include a name field to allow a user to specify the name of the interface being added. The interface being added may be a brand new interface created using a create-new option. Alternatively, the interface being added may be an existing interface using a load-existing option. In on embodiment, these options may be implemented using one or more radio buttons, such that only one of the options may be selected. Other configurations, such as, a pull-down menu or a combo box may be utilized. In addition, the pop-up window may include an archive file field to specify an archive filename that the interface being added is a member. A user may further browse for an archive file using a browse button. The operations of the pop-up window may be confirmed by activating an OK button or alternatively, canceled by activating a cancel button. Other capability may also be implemented. For example, the pop-up window may further include a search capability that a user may search a specific archive file. Alternatively, an archive file may be dragged and dropped into window 115 from another location.

Figure 4:
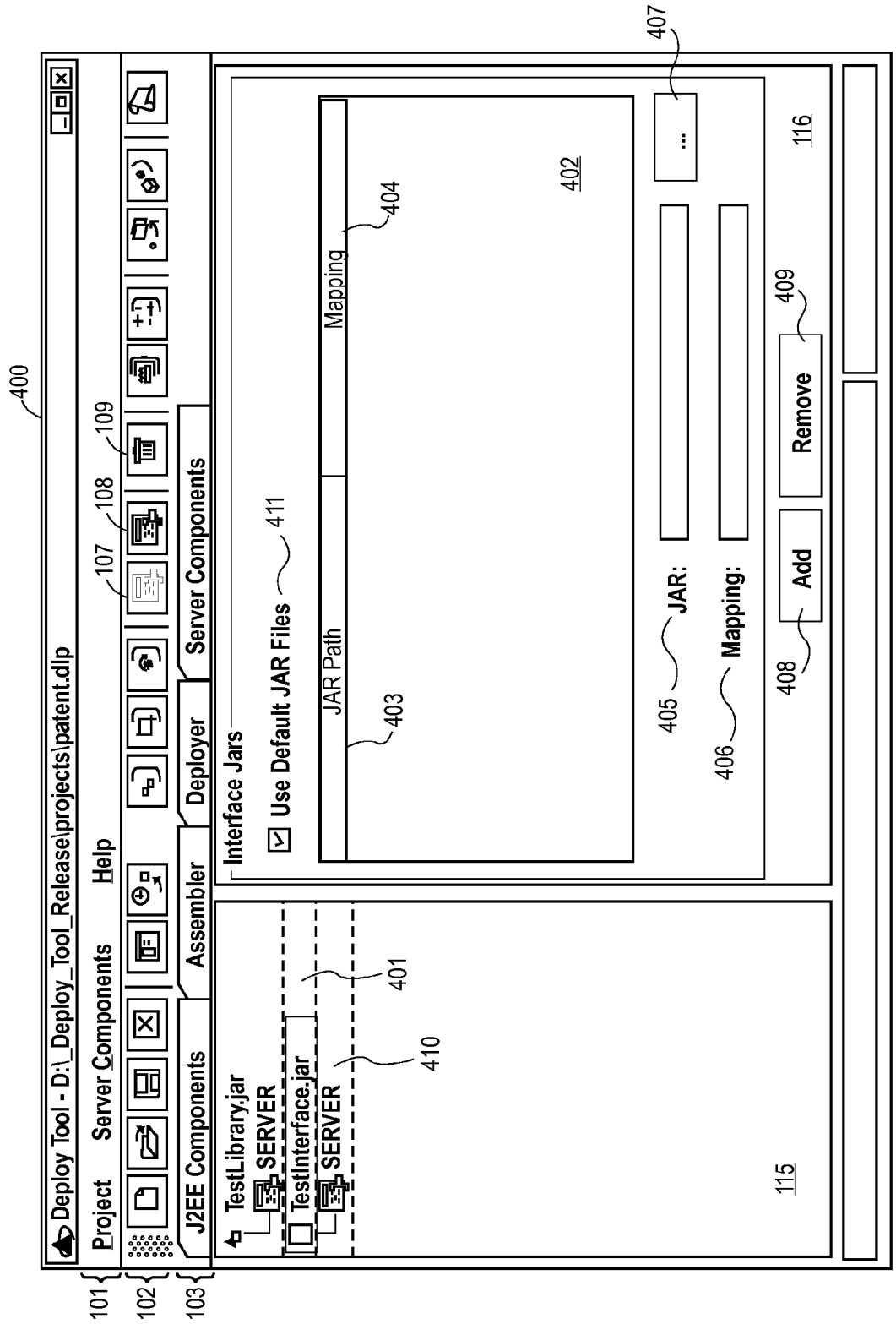
FIGS. 4 and 5 are block diagrams illustrating exemplary GUIs for editing an interface component, according to one embodiment of the invention.

Once the OK button is activated, according to one embodiment, the archive file specified in the pop-up window may be displayed in window 115, as shown in FIG. 4. Referring to FIG. 4, similar to FIG. 1, exemplary GUI 400 includes a menu bar 101 having one or more pull-down menus including one or more selectable items, a tool bar 102 having one or more buttons or controls, and page selector area 103 having one or more page selectors to display one or more pages within the exemplary GUI 400. These bars 101-103 may be substantially identical to those shown in FIG. 1. Some reference numbers concerning the members of these bars 101-103 may be omitted, in order to illustrate the features of the exemplary GUI 400 in more details. The omitted reference numbers may be referred to those shown in FIG. 1. Similarly, some of the reference numbers may be maintained as identical to those shown in FIG. 1 for the purposes of consistency.

Referring to FIG. 4, once an interface archive file has been added, either from a new archive file or from an existing archive file, a graphical representation of an archive file for one or more interface components may be displayed as archive file 401 in window 115. In addition, according to one embodiment, one or more properties associated with the archive file 401 may be displayed in window 116, when the graphical representation of the archive file is activated. Under each interface archive file listed in window 115 (e.g., archive file 401), according to one embodiment, one or more server or dispatcher components may be added using add server button 107 or add dispatcher button 108. For example, server component 410 under archive file 401 may be added by activating add server button 107.

Alternatively, one or more server or dispatcher components may be removed from an archive file using remove button 409. For example, server component 410 may be removed from archive file 401 by highlighting server component 410 in window 115 and activating remove button 409. It will be appreciated that the above actions may also be performed via one or more menu items from a menu, such as, for example, a pull-down menu 611 shown in FIG. 6. Other activation manner, such as, for example, a voice interactive command, one or more keys combination (also referred to as function keys or hot keys), etc., may be utilized.

According to one embodiment, for the purposes of illustrations, when the archive file 401 is selected, one or more properties associated with the archive file 401 may be displayed in window 116. In this example, according to one embodiment, window 116 may include a sub-window 402 to display one or more archive files associated with the archive 401. Window 402 may include an archive path field 403 to specify a path and a location of an archive file and the mapping field 404 to map the archive file specified in the archive path field 403 with an archive name.

In addition, according to one embodiment, one or more archive files may be added to the archive 401, which may be displayed in window 402 when added. The additional archive files may be specified in field 405 and the mapping information may be specified in field 406. A user may also browse for the additional archive file using a browsing button 407. Alternatively, an archive file may be dragged and dropped into window 115 from another location. Once the user has specified an archive file in field 405 and the optional mapping information in field 406, the specified archive file may be added by activating add button 408. The added archive file will be displayed in window 402. Similarly, one or more archive files listed in window 402 may be removed by selecting an archive file in window 402 and activating a remove button 409. Alternatively, one or more items in the window 202 may be removed via a drag-and-drop operation.

Furthermore, according to one embodiment, for each interface archive (e.g., archive 401), only one server component and one dispatcher component may be added. As a result, after server component 410 has been added, the add server button 107 may be disabled (e.g., grayed out), such that no more server component may be added. However, the add dispatcher button 108 may be still enabled because one more dispatcher component may be added under archive 401. When a server component or a dispatcher component is added, a user is given an opportunity to provide a name for the component being added. For example, a dialog box or a pop-up window, such as, window 117 of FIG. 1, may be used to prompt the user for the name of the component. Without a specific name from the user, a default name may be used. Further, a default interface archive file may be used by selecting option 411. Other options or configurations may be included.

Figure 5:
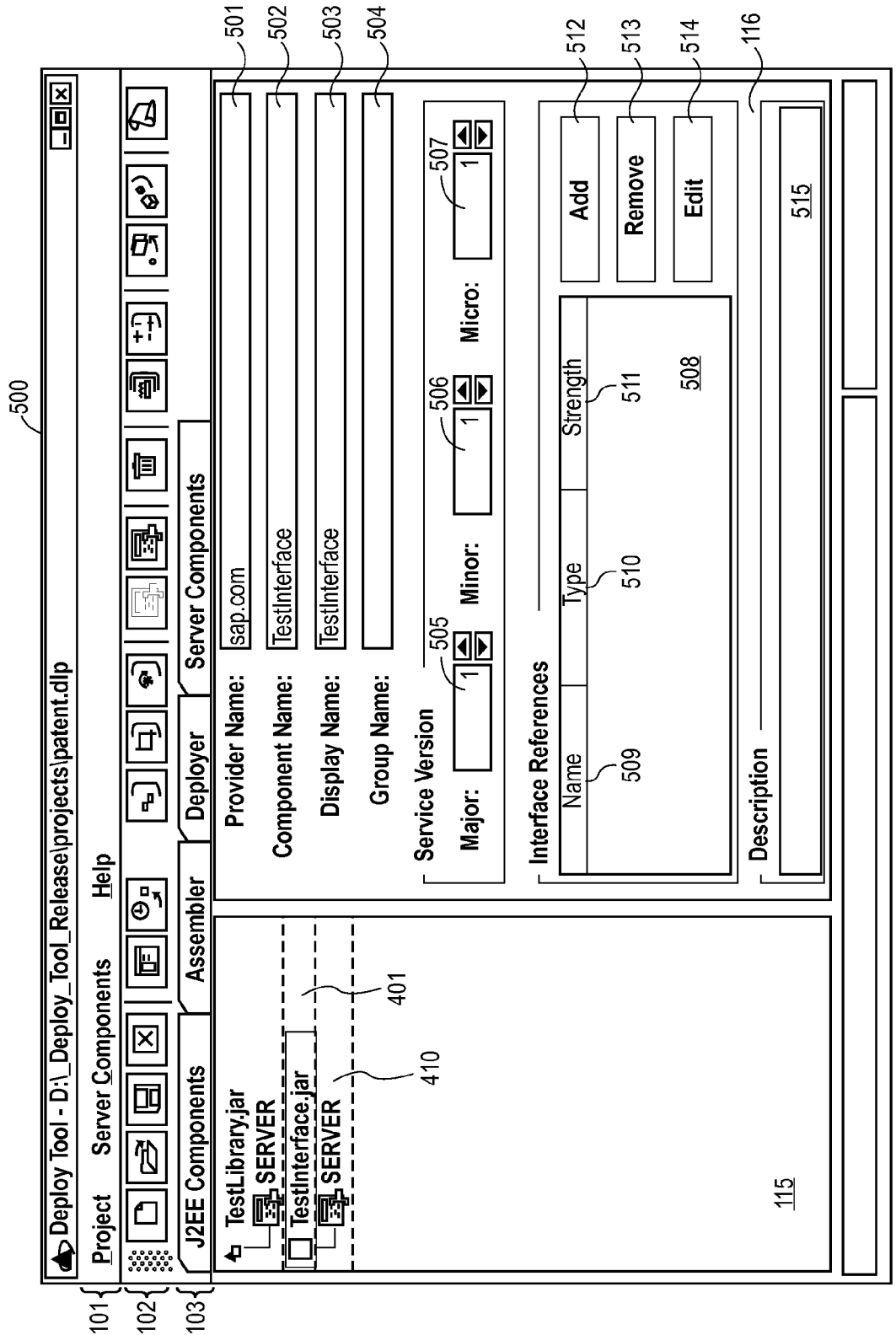

When a user selects a component, such as server component 410 in window 115, according to one embodiment, one or more properties associated with the selected component may be displayed in window 116, where some or all of the properties may be edited, as shown in FIG. 5. Referring to FIG. 5, similar to FIG. 1, exemplary GUI 500 includes a menu bar 101 having one or more pull-down menus including one or more selectable items, a tool bar 102 having one or more buttons or controls, and page selector area 103 having one or more page selectors to display one or more pages within the exemplary GUI 500. These bars 101-103 may be substantially identical to those shown in FIG. 1. Some reference numbers concerning the members of these bars 101-103 may be omitted, in order to illustrate the features of the exemplary GUI 500 in more details. The omitted reference numbers may be referred to those shown in FIG. 1. Similarly, some of the reference numbers may be maintained as identical to those shown in FIGS. 1 and 4 for the purposes of consistency.

For the purposes of illustrations, according to one embodiment, when server component 410 is selected in window 115, one or more properties associated with server component 410 may be displayed in window 116. In one embodiment, the properties displayed in window 116 includes, but not limited to, a provider name field 501, a component name field 502, a display name field 503, and a group name field 504.

In one embodiment, the provider name field 501 may be used to specify a provider of the component, such as, for example, a Web server from a provider (e.g., sap.com). The component name field 502 may be used to specify the name under which the component may be registered in a service container, which will be described in details further below. The display name field 503 may be used to specify a display name that identifies the component and the name of the group that the component is a member of may be specified in a group name field 504.

In addition, the properties displayed in window 116 may further include a service version field. In one embodiment, a major service version may be specified in a major version field 505. A minor service version may be specified in a minor version field 506 and a micro service version may be specified in a micro version field 507. In one embodiment, service version includes three digits, where the first, second, and third digits are corresponding to the major, minor, and micro versions.

Furthermore, according to one embodiment, the properties displayed in window 116 may further include a reference table 508 to specify the component references in the library references and/or interface references. In one embodiment, the reference table 508 includes a name field 509, a type field 510, and a strength field 511. The name field 509 may be used to specify a name of a service, library, or interface, to which the component refers. The type field 510 may be used to specify the type of the reference to another library or interface. In one embodiment, each library may refer to libraries or interfaces and each interface may refer to interfaces only. The strength field 511 may be used to specify the strength of the reference. In one embodiment, the strength of the reference (also referred to as dependency relationship) may include a strong, a weak, and a notify references, which will be described in details further below. In one embodiment, the interface and library references may only support a weak reference.

In one embodiment, one or more references may be added using an add reference button 512, removed using a remove reference button 513, and/or edited using an edit reference button 514. Further, a description concerning the component may be edited or displayed in description window 515. It will be appreciated that some well-known user interfaces are not shown herein in order not to obscure embodiments of the present invention in unnecessary detail.

Exemplary Service Component Processing

In one embodiment, a service component may be added or removed using the exemplary GUI 100 of FIG. 1. For example, a service component may be added by activating the add service button 106 of FIG. 1. According to one embodiment, when the add service button 106 is activated, a dialog box or a pop-up window, similar to dialog box 117 of FIG. 1, is displayed to prompt the user for the service being added. The dialog box may also be displayed when the user selects a corresponding item from a pull-down menu, such as the pull-down menu 611 shown in FIG. 6.

In one embodiment, the pop-up window may include a name field to allow a user to specify the name of the service being added. The service being added may be a brand new service created using a create-new option. Alternatively, the service being added may be an existing service using a load-existing option. In on embodiment, these options may be implemented using one or more radio buttons, such that only one of the options may be selected. Other configurations, such as, a pull-down menu or a combo box may be utilized. In addition, the pop-up window may include an archive file field to specify an archive filename that the interface being added is a member. A user may further browse for an archive file using a browse button. The operations of the pop-up window may be confirmed by activating an OK button or alternatively, canceled by activating a cancel button. Other capability may also be implemented. For example, the pop-up window may further include a search capability that a user may search a specific archive file. Alternatively, an archive file may be dragged and dropped into window 115 from another location.

Figure 6:
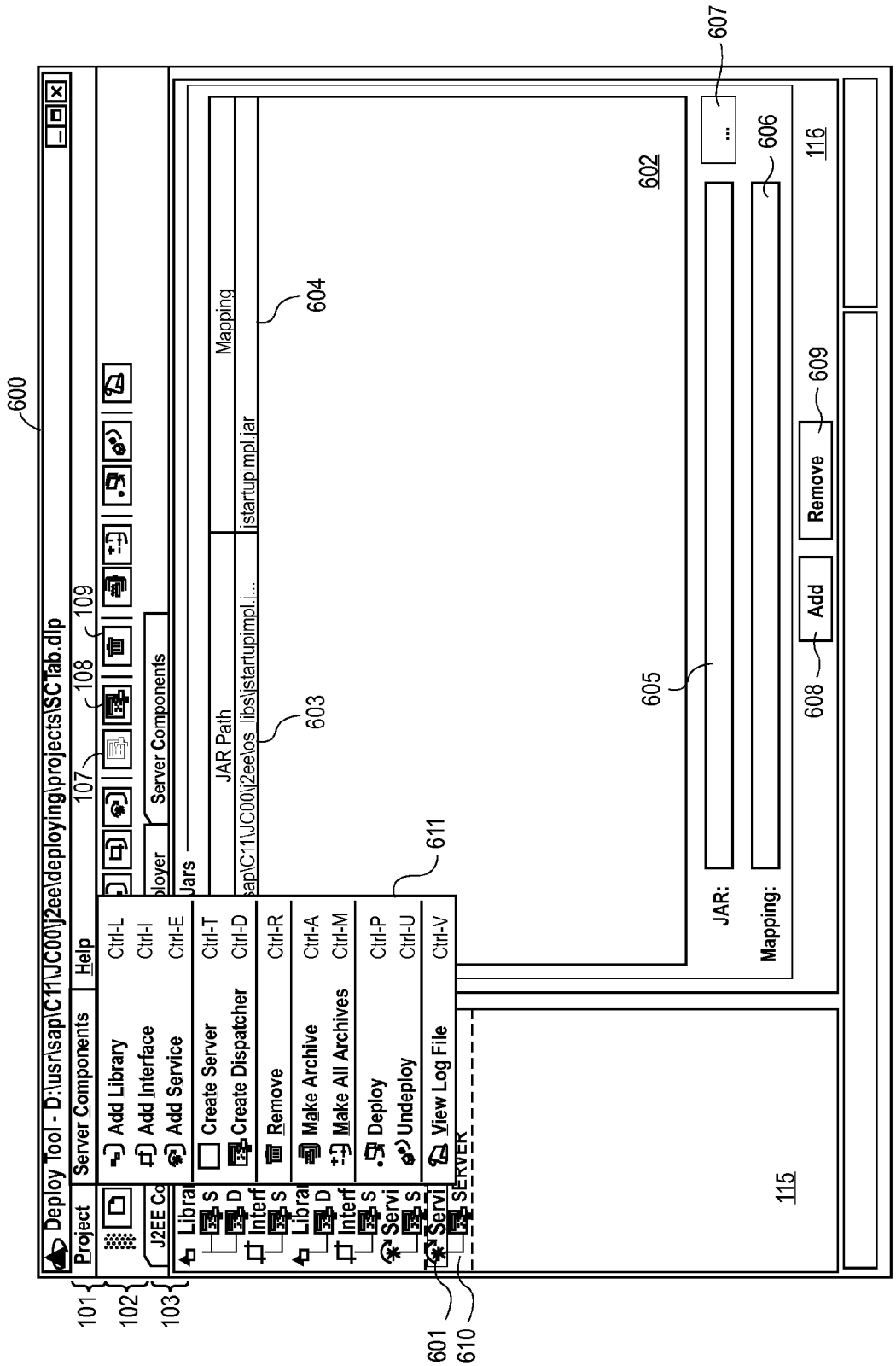
FIGS. 6-9 are block diagrams illustrating exemplary GUIs for editing a service component, according to one embodiment of the invention.

Once the OK button is activated, according to one embodiment, the archive file specified in the pop-up window may be displayed in window 115, as shown in FIG. 6. Referring to FIG. 6, similar to FIG. 1, exemplary GUI 600 includes a menu bar 101 having one or more pull-down menus including one or more selectable items, a tool bar 102 having one or more buttons or controls, and page selector area 103 having one or more page selectors to display one or more pages within the exemplary GUI 600. These bars 101-103 may be substantially identical to those shown in FIG. 1. Some reference numbers concerning the members of these bars 101-103 may be omitted, in order to illustrate the features of the exemplary GUI 600 in more details. The omitted reference numbers may be referred to those shown in FIG. 1. Similarly, some of the reference numbers may be maintained as identical to those shown in FIG. 1 for the purposes of consistency.

Referring to FIG. 6, once a service archive file has been added, either from a new archive file or from an existing archive file, a graphical representation of an archive file for one or more service components may be displayed as archive file 601 in window 115. In addition, according to one embodiment, one or more properties associated with the archive file 601 may be displayed in window 116, when the graphical representation of the archive file is activated. Under each interface archive file listed in window 115 (e.g., archive file 601), according to one embodiment, one or more server or dispatcher components may be added using add server button 107 or add dispatcher button 108. For example, server component 610 under archive file 601 may be added by activating add server button 107.

Alternatively, one or more server or dispatcher components may be removed from an archive file using remove button 109. For example, server component 610 may be removed from archive file 601 by highlighting server component 610 in window 115 and activating remove button 109. It will be appreciated that the above actions may also be performed via one or more menu items from a menu, such as, for example, a pull-down menu 611. Other activation manner, such as, for example, a voice interactive command, one or more keys combination (also referred to as function keys or hot keys), etc., may be utilized.

According to one embodiment, for the purposes of illustrations, when the archive file 601 is selected, one or more properties associated with the archive file 601 may be displayed in window 116. In this example, according to one embodiment, window 116 may include a sub-window 602 to display one or more archive files associated with the archive 601. Window 602 may include an archive path field 603 to specify a path and a location of an archive file and the mapping field 604 to map the archive file specified in the archive path field 603 with an archive name.

In addition, according to one embodiment, one or more archive files may be added to the archive 601, which may be displayed in window 602 when added. The additional archive files may be specified in field 605 and the mapping information may be specified in field 606. A user may also browse for the additional archive file using a browsing button 607. Alternatively, an archive file may be dragged and dropped into window 115 from another location. Once the user has specified an archive file in field 605 and the optional mapping information in field 606, the specified archive file may be added by activating add button 608. The added archive file will be displayed in window 602. Similarly, one or more archive files listed in window 602 may be removed by selecting an archive file in window 602 and activating a remove button 609. Alternatively, one or more items in the window 602 may be removed via a drag-and-drop operation.

Furthermore, according to one embodiment, for each service archive (e.g., archive 601), only one server component and one dispatcher component may be added. As a result, after server component 610 has been added, the add server button 107 may be disabled (e.g., grayed out), such that no more server component may be added. However, the add dispatcher button 108 may be still enabled because one more dispatcher component may be added under archive 601. When a server component or a dispatcher component is added, a user is given an opportunity to provide a name for the component being added. For example, a dialog box or a pop-up window, such as, window 117 of FIG. 1, may be used to prompt the user for the name of the component. Without a specific name from the user, a default name may be used. Other options or configurations may be included.

Figure 7:
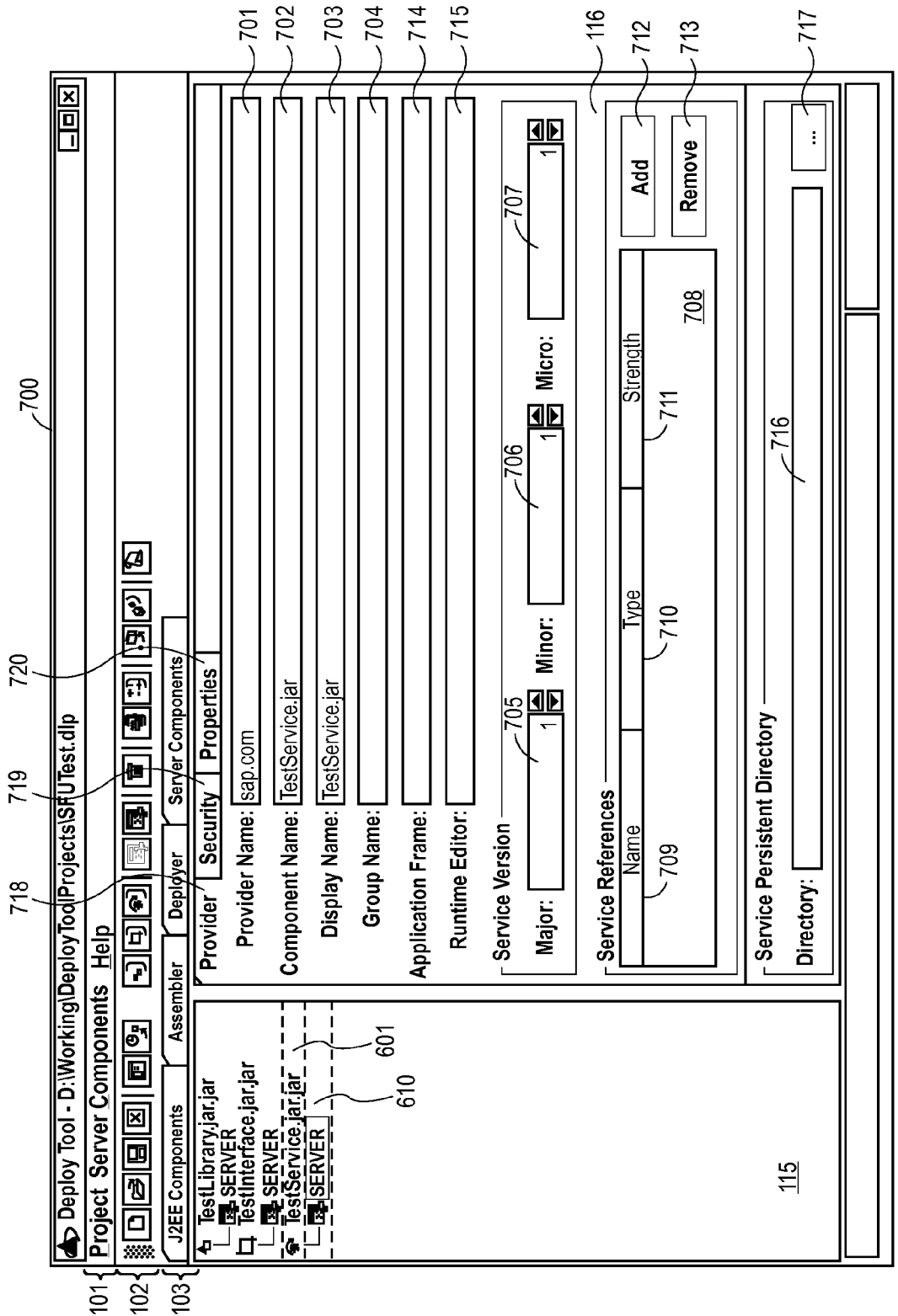

When a user selects a component, such as server component 610 in window 115, according to one embodiment, one or more properties associated with the selected component may be displayed in window 116, where some or all of the properties may be edited, as shown in FIG. 7. Referring to FIG. 7, similar to FIG. 1, exemplary GUI 700 includes a menu bar 101 having one or more pull-down menus including one or more selectable items, a tool bar 102 having one or more buttons or controls, and page selector area 103 having one or more page selectors to display one or more pages within the exemplary GUI 700. These bars 101-103 may be substantially identical to those shown in FIG. 1. Some reference numbers concerning the members of these bars 101-103 may be omitted, in order to illustrate the features of the exemplary GUI 700 in more details. The omitted reference numbers may be referred to those shown in FIG. 1. Similarly, some of the reference numbers may be maintained as identical to those shown in FIGS. 1 and 6 for the purposes of consistency.

For the purposes of illustrations, according to one embodiment, when server component 610 is selected in window 115, one or more properties associated with server component 610 may be displayed in window 116. Window 116 may include multiple pages of properties associated with service component 610. In one embodiment, window 116 includes a provider page displayable by page selector 718, a security page displayable by page selector 719, and a properties page displayable by page selector 720. The above pages may also be displayed using other manners, such as, by selecting a corresponding item from a pull-down menu, such as menu 611 of FIG. 6.

In one embodiment, the provider page displayed in window 116 includes, but not limited to, a provider name field 701, a component name field 702, a display name field 703, a group name field 704, an application frame field 714, and a runtime editor field 715. In one embodiment, the provider name field 701 may be used to specify a provider of the component, such as, for example, a Web server from a provider (e.g., sap.com). The component name field 702 may be used to specify the name under which the component may be registered in a service container, which will be described in details further below. The display name field 703 may be used to specify a display name that identifies the component and the name of the group that the component is a member of may be specified in a group name field 704. The application frame field 714 may be used to specify a class file that implements the application service frame. The application service frame is responsible for the service business logic. The runtime frame field 715 may be used to specify a JAVA® class which will be used for runtime edit in an administration tool.

In addition, the properties displayed in window 116 may further include a service version field. In one embodiment, a major service version may be specified in a major version field 705. A minor service version may be specified in a minor version field 706 and a micro service version may be specified in a micro version field 707. In one embodiment, service version includes three digits, where the first, second, and third digits are corresponding to the major, minor, and micro versions.

Furthermore, according to one embodiment, the properties displayed in window 116 may further include a reference table 708 to specify the component references in the library references and/or interface references. In one embodiment, the reference table 708 includes a name field 709, a type field 710, and a strength field 711. The name field 709 may be used to specify a name of a service, library, or interface, to which the component refers. The type field 710 may be used to specify the type of the reference to another library or interface. In one embodiment, each library may refer to libraries or interfaces and each interface may refer to interfaces only. The strength field 711 may be used to specify the strength of the reference. In one embodiment, the strength of the reference (also referred to as dependency relationship) may include a strong, a weak, and a notify references, which will be described in details further below. In one embodiment, the interface and library references may only support a weak reference. In one embodiment, one or more references may be added using an add reference button 712 and removed using a remove reference button 713. In one embodiment, there is an edit button in the GUI (not shown).

Furthermore, according to one embodiment, window 116 may further include a service persistent directory field 716 to specify a path to a directory where some or all work files for the service to be stored. The service persistent directory may also be located using a browse button 717. It will be appreciated that some well-known user interfaces are not shown herein in order not to obscure embodiments of the present invention in unnecessary detail.

Figure 8:
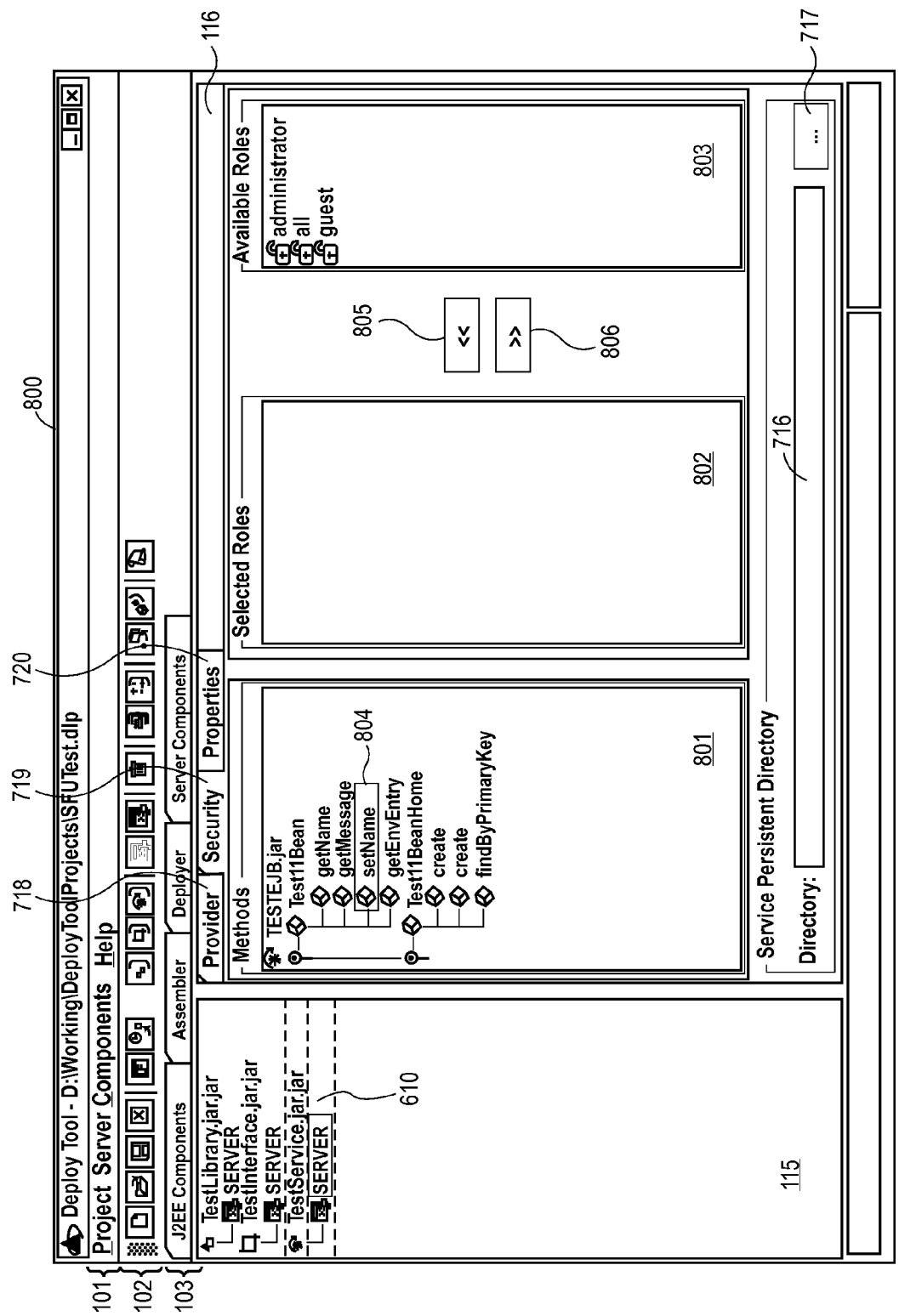

FIG. 8 is a block diagram illustrating an exemplary GUI for deploying a service component according to one embodiment of the invention. The exemplary GUI 800 may be displayed when a user selects a security page by selecting the service security tab 719 of FIG. 7. Referring to FIG. 8, similar to FIG. 1, exemplary GUI 800 includes a menu bar 101 having one or more pull-down menus including one or more selectable items, a tool bar 102 having one or more buttons or controls, and page selector area 103 having one or more page selectors to display one or more pages within the exemplary GUI 800. These bars 101-103 may be substantially identical to those shown in FIG. 1. Some reference numbers concerning the members of these bars 101-103 may be omitted, in order to illustrate the features of the exemplary GUI 800 in more details. The omitted reference numbers may be referred to those shown in FIG. 1. Similarly, some of the reference numbers may be maintained as identical to those shown in FIGS. 1 and 6-7 for the purposes of consistency.

Referring to FIG. 8, in one embodiment, the security page 719 includes, but not limited to, a method field 801, a selected role field 802, and an available role field 803. The method field 801 may be used to provide a list of all public methods from class files in the service package file (e.g., a *.jar file). The selected role field 802 may be used to list the selected roles for a specific method, such as, for example, a selected method 804. The available role field 803 may be used to list all available roles available to be added to the selected role field 802. To add a method, according to one embodiment, a method in the method field 801 is selected (e.g., highlighted method 804). One or more roles from the available role field 803 are selected and a left-handed arrow button. 805 is activated. As a result, the selected roles are added to the selected role field 802. Similarly, one or more roles from the selected role field 802 may be removed back to the available role field 803 by selecting one or more selected roles in field 802 and activating a right-handed arrow button 806. It will be appreciated that some well-known user interfaces are not shown herein in order not to obscure embodiments of the present invention in unnecessary detail.

Figure 9:
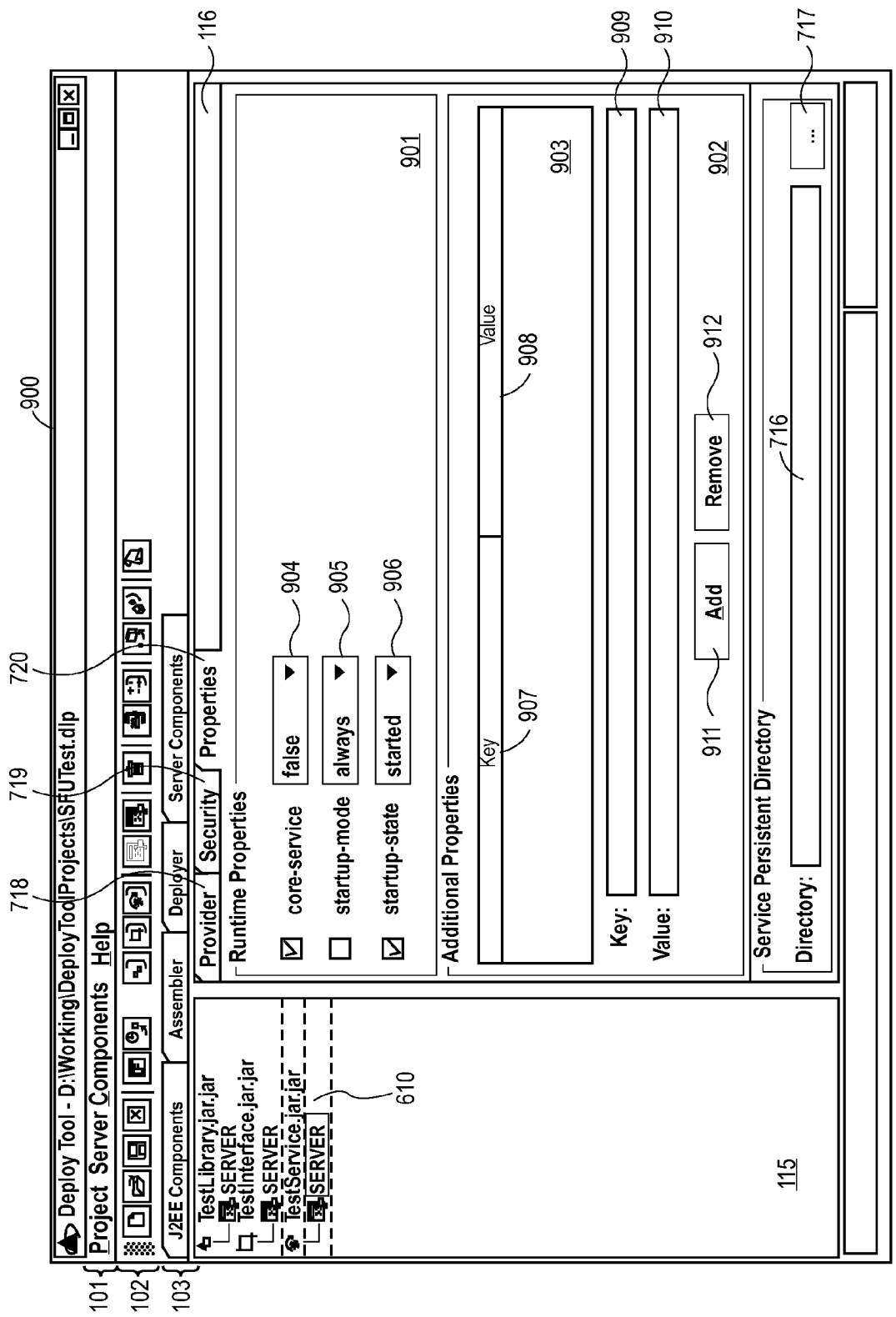

FIG. 9 is a block diagram illustrating an exemplary GUI for deploying a service component according to one embodiment of the invention. The exemplary GUI 900 may be displayed when a user selects a property page by selecting the service property tab 720 of FIG. 7. Referring to FIG. 9, similar to FIG. 1, exemplary GUI 900 includes a menu bar 101 having one or more pull-down menus including one or more selectable items, a tool bar 102 having one or more buttons or controls, and page selector area 103 having one or more page selectors to display one or more pages within the exemplary GUI 900. These bars 101-103 may be substantially identical to those shown in FIG. 1. Some reference numbers concerning the members of these bars 101-103 may be omitted, in order to illustrate the features of the exemplary GUI 900 in more details. The omitted reference numbers may be referred to those shown in FIG. 1. Similarly, some of the reference numbers may be maintained as identical to those shown in FIGS. 1 and 6-7 for the purposes of consistency.

Referring to FIG. 9, in one embodiment, service property page 720 includes, but not limited to, a runtime property field 901 and an additional property field 902. In one embodiment, the runtime properties listed in field 901 are key-value pairs used by a service manager. In a particular embodiment, runtime properties include, among others, core service 904, startup mode 905, and startup state 906. The values for the core service 904 may include a "true" and "false" values. The values for startup mode 905 may include an "always", "manual", and "automatic" values. The values for startup state 906 may include "started" and "stopped" values. The values of properties 904-906 may be selected using a pulldown menu, a combo box, and other selection mechanisms.

In one embodiment, the additional property field 902 may be used to specify one or more additional properties. The additional properties may be added to additional property table 903 having a key 907 and a value 908 pair. An additional property may be added to the table 903 by specifying the key in the key entry field 909 and its value in the value field 910, and activating the add button 911. Similarly, one or more properties listed in table 903 may be removed by selecting one or more properties in table 903 and activating remove button 912. It will be appreciated that some well-known user interfaces are not shown herein in order not to obscure embodiments of the present invention in unnecessary detail.

Figure 10:
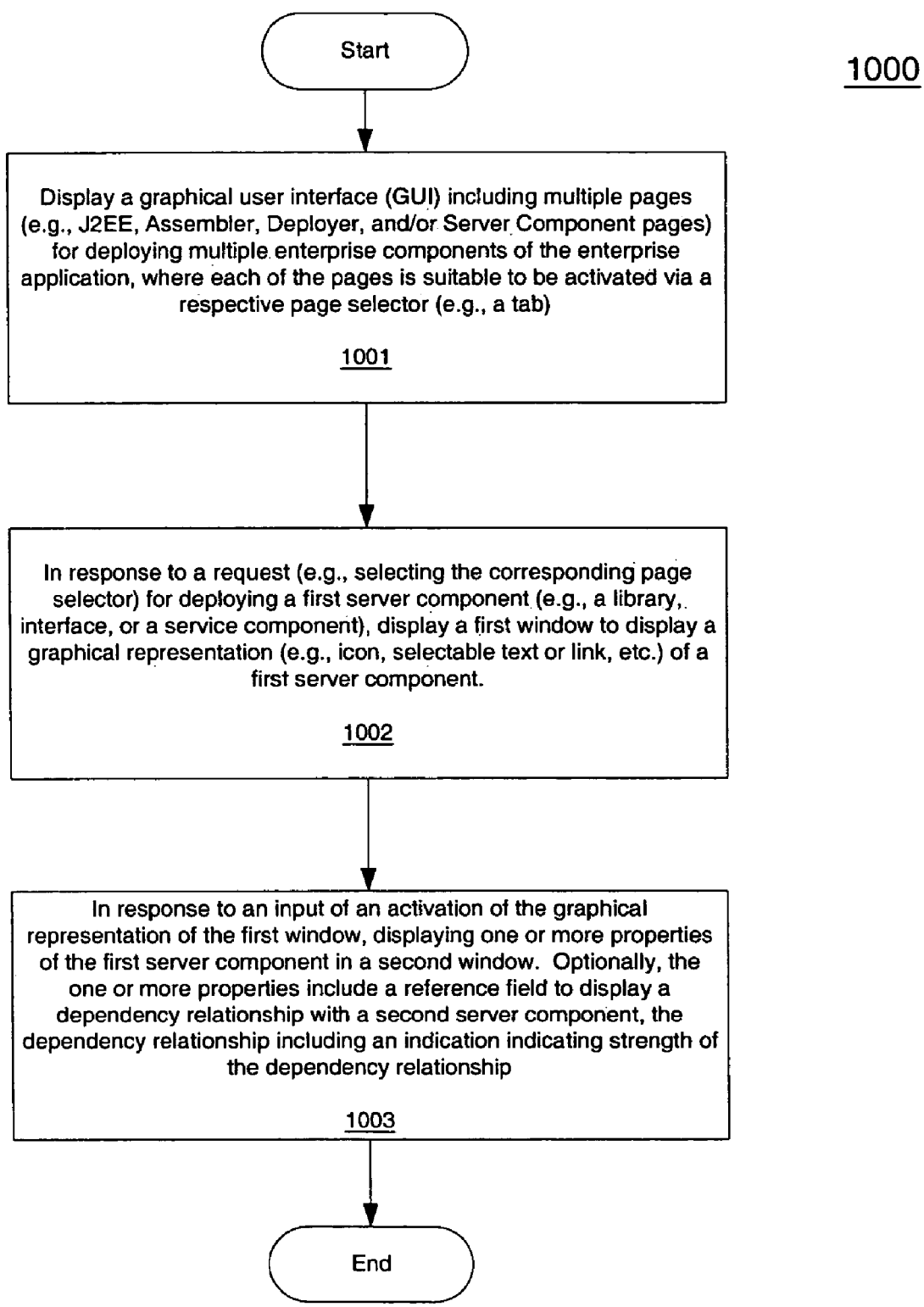
FIG. 10 is a flow diagram illustrating an exemplary process for deploying an enterprise application according to one embodiment of the invention.

FIG. 10 is a flow diagram illustrating an exemplary process for deploying an enterprise application according to one embodiment of the invention. Exemplary process 1000 may be performed by a processing logic that may include hardware (circuitry, dedicated logic, etc.), software (such as is run on a dedicated machine), or a combination of both. Referring to FIG. 10, at block 1001, a graphical user interface (GUI) is displayed. In one embodiment, the GUI, such as, for example, exemplary GUI 100 of FIG. 1, may include multiple pages for deploying enterprise components of an enterprise application, where each of the page is selectable via a corresponding page selector (e.g., a tab). For example, the GUI may include a J2EE® component page 125, an assembler page 126, a deployer page 127, and a server component page 128 as shown in FIG. 1, having specific functionality as described above.

At block 1002, in response to a request for editing and deploying a first server component, a first window is displayed to display a graphical representation of the first server component. The request may be received by selecting the corresponding page selector of the server component page. In one embodiment, the server component may be a library, an interface, or a service component. The graphical representation may be an icon, a selectable text or link, etc.

At block 1003, in response to an input received from an activation of the graphical representation in the first window, a second window is displayed to display one or more properties associated with the first server component. In one embodiment, the one or more properties of the first component may include a reference field to display a dependency relationship with a second server component. In a particular embodiment, the dependency relationship may further include an indication indicating strength of the dependency relationship. Other operations apparent to those with ordinary skill in the art may be performed.

Again, the exemplary GUIs and/or processes shown in FIGS. 1-10 are illustrated for illustrations purposes only. The functionality and the layout of the GUIs may vary. For example, the tool bar and/or the page selectors may be implemented at different locations of the GUIs, such as, for example, at the bottom of the GUI near the status bar. The number of the buttons or controls associated with the tool bar and the page selectors may vary. The buttons, the fields, the page selectors, and/or other controls may be activated via a variety of manners. For example, those buttons, icons, controls, and page selectors, etc., may be activated through one or more keys from a keyboard and/or a pointing device (e.g., a mouse). It will be appreciated that they can also be activated via other methods apparent to those with ordinary skill in the art, such as, for example, a voice interactive command, a stylus, or a command received over a network, such as a VPN (virtual private network), etc. It will be appreciated that some well-known user interfaces are not shown in order not to obscure embodiments of the present invention in unnecessary detail.

Further, the exemplary GUIs and/or processes -shown in FIGS. 1-10 may be a part of deployment utility for deploying enterprise applications. Alternatively, the exemplary GUIs may be integrated into an integrated development environment (IDE) for developing enterprise applications, such as, for example, the NetWeaver® developer studio from SAP AG, JAVA® development kit (JDK®) from SUN MICROSYSTEMS, or MICROSOFT®.NET development studio (e.g., C#® visual development studio, VISUAL BASIC-.NET® and/or ASP.NET®) from MICROSOFT Corporation, etc.

Exemplary Enterprise Architecture

Figure 11:
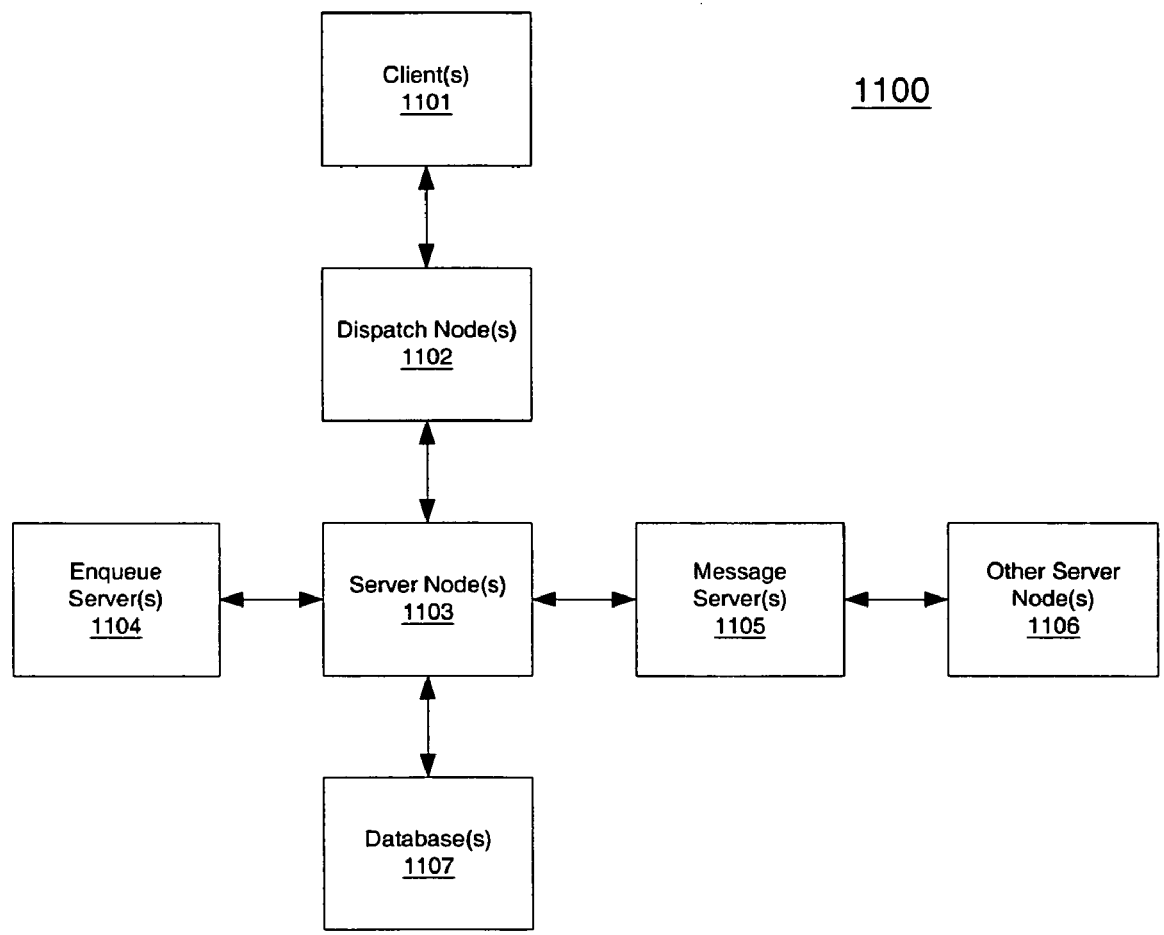
FIG. 11 is a block diagram illustrating an exemplary enterprise application system according to one embodiment of the invention.

FIG. 11 is a block diagram illustrating an exemplary enterprise application system according to one embodiment of the invention. In one embodiment, the exemplary system 1100 includes, but is not limited to, one or more client nodes 1101, one or more dispatch nodes 1102, one or more server nodes 1103, an enqueue server 1104, a message server 1105, database 1107, and other server nodes 1106. In one embodiment, dispatch node 1102 receives a request from client node 1101 and sends the request to an appropriate server node 1103. In one embodiment, if there is a session already assigned to the respective client, the request is forwarded to the server mapped to the respective session. Otherwise, an appropriate server is chosen using an algorithm for load balancing.

In one embodiment, server node 1103 receives the request. During its procession it is possible to access data from the database 1107, to set locks into enqueue server 1104, or even to send a message to other cluster nodes, such as server nodes 1106. The database 1107 stores most of the system configuration data, binaries and applications. In one embodiment, database 1107 supports databases from SAP, ORACLE, INFORMIX, SQL from MICROSOFT, DB2 from IBM, etc.

In one embodiment, the communication between the nodes in the system is done using message server 1105. The message server 1105 may be a JAVA message server (JMS). In one embodiment, each server node (also referred to as a cluster node) keeps a permanently open TCP socket, through which messages are exchanged. In one embodiment, enqueue server 1104 is used to provide a special lock mechanism that synchronizes access to system resources. The purpose of this mechanism is to prevent several threads from accessing a system resource simultaneously. For this purpose the resource may be locked by the thread that will use it. Other components may be included.

Figure 12:
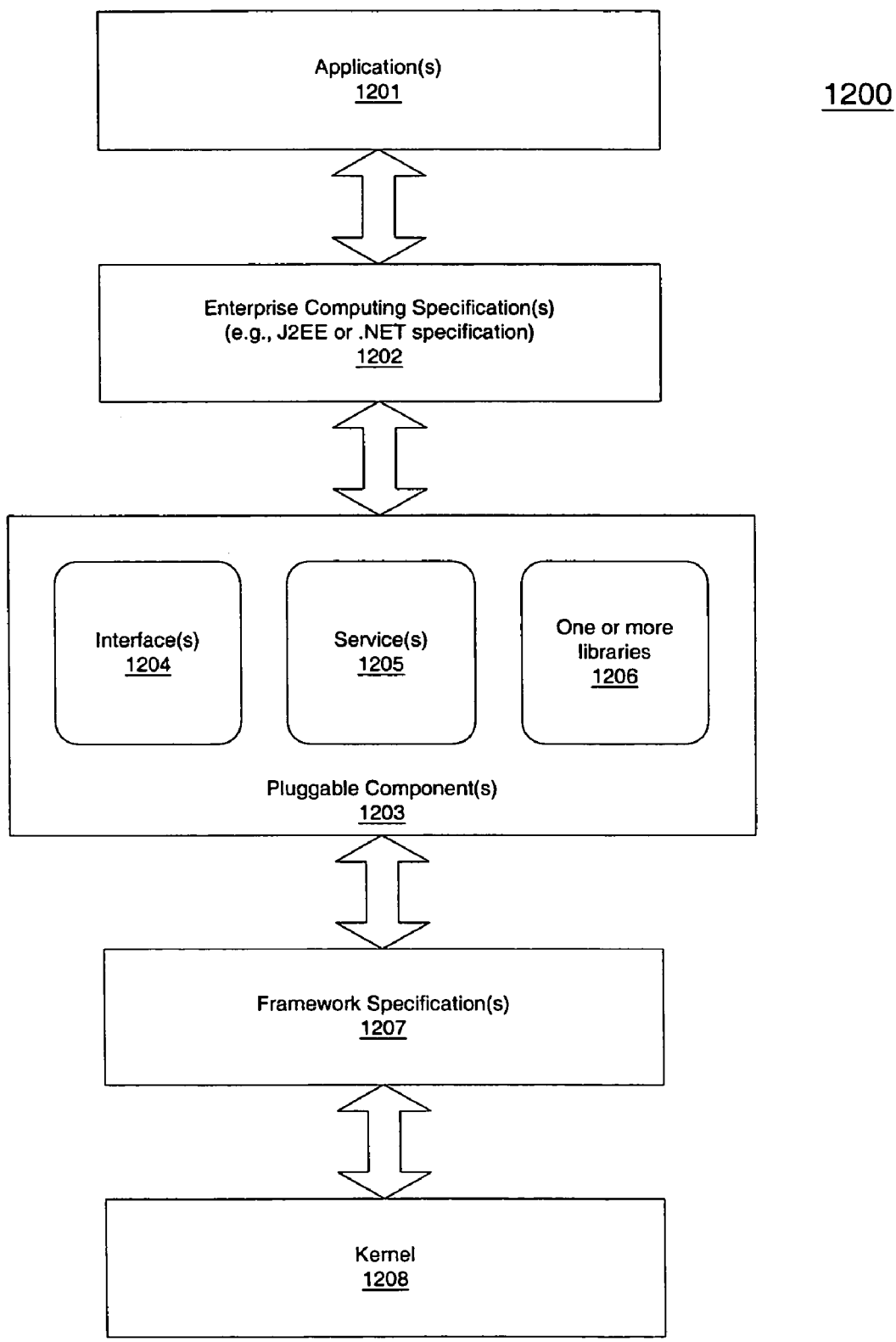
FIG. 12 is a block diagram illustrating an exemplary architecture of a cluster node according to one embodiment of the invention.

FIG. 12 is a block diagram illustrating an exemplary architecture of a cluster node according to one embodiment of the invention. The exemplary cluster node may be implemented as server nodes 1103 and 1106 of FIG. 11, or other components. In one embodiment, exemplary architecture 1200 includes, but is not limited to, application 1201, enterprise computing specifications, such as, for example, J2EE® or NET® specifications, pluggable components 1203 including, among others, interface 1204, service 1205, and library 1206, framework specification 1207, and kernel 1208.

In one embodiment, kernel 1208 implements the system basic (low level) functionality, such as, for example, threads handling, sockets communication, access to the persistent storage, etc. The kernel 1208 may be divided into several subsystems called managers (not shown). There is a special order of activating these systems during startup. In one embodiment, one way for accessing a subsystem from the upper level component is the subsystem interface to become part from the APIs (Application Programming Interfaces) described in the framework. In one embodiment, framework 1207 is a set of interfaces that separates kernel from the next level. The kernel 1208 acts as a container for the next level components, such as interface 1204, service 1205, and library 1206.

The second level of the cluster node architecture is represented by pluggable components 1203, which may include, among others, interface 1204, service 1205, and library 1206. Interface components are "contracts" how different components work together in the system. They are constituted of name and classes. The interfaces can be used for working with the service component that provides their implementations. Library components have name, classes and objects. They create objects during loading or later when the objects are requested. Service components have special methods that are called after loading and that create and register runtime objects. Service components can access various APIs provided by the kernel of the system.

In one embodiment, each component may have three different types of references to other components: notify, weak and hard (e.g., strong). The notify reference may be useful for components that invoke methods of other components. When one component has a notify reference to another component, according to one embodiment, the system may perform the following:

If the second component exists, a link between class loaders (from the first one to the second) is set.

There is no requirement for the second component to be part of the system. The first component may be resolved even if the second is not a system component.

All events connected with changing the state of a second component may be sent to the first one.

Weak references may be used when one component wants to use classes provided by another component. In such cases, according to one embodiment, the system may perform the following:

If the second component exists, a link between class loaders (from the first one to the second) is set.

In order to successfully resolve the first component, the second one has to be resolved. In case of a cycle, the second component has to be resolved in substantially the same operation as the first one.

All events connected with changing the state of a second component are sent to the first one.

If the system has to unload the second component, it may have to unload the first one.

In one embodiment, one component has a hard reference to another when it wants to use classes and runtime objects provided by the second component. In such cases, according to one embodiment, the system may perform the following:

If the second component exists, a link between class loaders (from the first one to the second) is set.

In order to successfully resolve the first component, the second one has to be resolved. In case of a cycle, the second component has to be resolved in substantially the same operation as the first one.

All events connected with changing the state of a second component are sent to the first one.

The first component can be started only if the second one is already started.

If the system has to stop the second component, it may have to stop the first one before stopping the second one.

If the system has to unload the second component, it may have to unload the first one before unloading the second one.

Hard reference cycles are not allowed.

Referring back to FIG. 12, in one embodiment, application 1201 forms the third level in the architecture of the server cluster node. Application 1201 communicates with the system component level through a set of specifications (e.g., enterprise specifications 1202) provided by a variety of enterprise vendors, such as, for example, JAVA from SUN MICROSYSTEMS or .NET framework from MICROSOFT Corporation. This architecture level implements the end client business logic and works with high-level patterns, leaving the detailed implementation to the lower levels.

Figure 13:
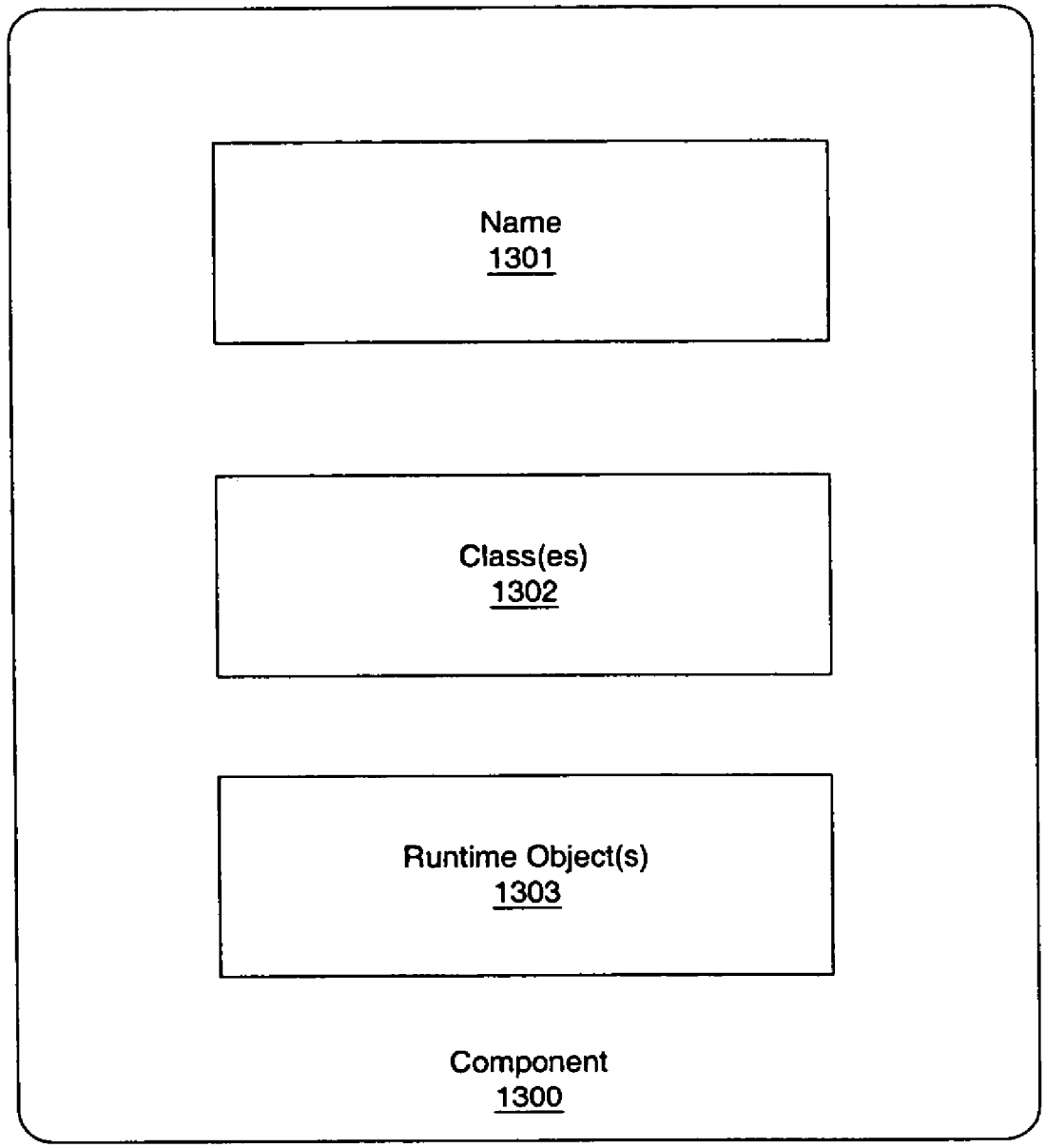
FIG. 13 is a block diagram illustrating an exemplary structure of a component according to one embodiment of the invention.

In one embodiment, each of the components, such as components 1204-1206, may include three major parts: name, classes and objects that it provides at runtime. FIG. 13 is a block diagram illustrating an exemplary structure of a component according to one embodiment of the invention. In one embodiment, exemplary component 1300 includes, among others, name 1301, one or more classes 1302, and one or more runtime objects 1303. Each of the name 1301, class 1302, and runtime object 1303 may be registered at different registries. Each of the registries may have one or more individual rules for registering components.

The name of the component is typically unique in the system. In certain embodiments, it is possible for some components to use some classes from other components, also referred to as references. Before loading each component is resolved, the system checks if all the references between components are set correctly and detects any possible inconsistency in the class registry. In one embodiment, each set of classes for one component is presented by a class loader responsible for its loading. This class loader may be unique for each component. When a component wants to use classes from other component, a reference between their class loaders is set.

In one embodiment, when the component is successfully resolved, the system can load the component. It is possible for a component to create objects that are accessible at runtime by other components. The object registry contains all these objects.

Figure 14:
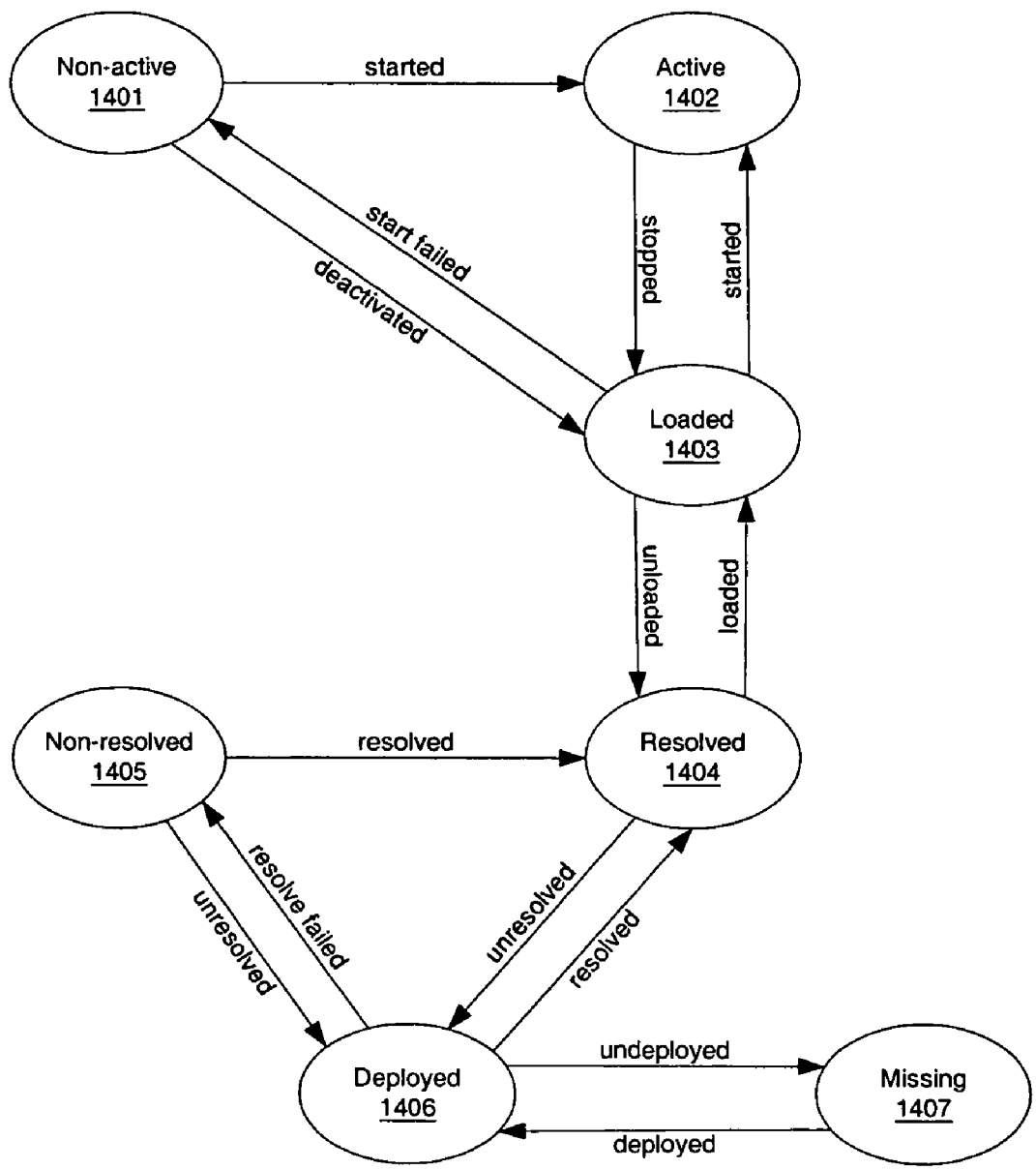
FIG. 14 is a state diagram illustrating an exemplary life cycle of an enterprise component according to one embodiment of the invention.

FIG. 14 is a state diagram illustrating an exemplary life cycle of an enterprise component according to one embodiment of the invention. Referring to FIG. 14, in one embodiment, the exemplary life cycle of an enterprise component 400 includes, but is not limited to, non-active state 1401, active state 1402, loaded state 1403, resolved state 1404, non-resolved state 1405, deployed state 1406, and missing state 1407.

According to one embodiment, when in the missing state 1407, a corresponding component is not a part of the system, while the component is a part of the system when it is deployed. Under the resolved state 1404, the corresponding component is a part of the system, in which case, all classes needed by the component are available in the system and the component can be loaded. Under the non-resolved state 1405, the component is a part of the system, but it's resolving operations failed. Under the loaded state 1403, the component is loaded by the system from a class loader created for the component. Under the active state 1402, the component is started and the runtime objects that it provides are available. Under the non-active state 1401, the component is loaded, but it cannot be started due to a variety of reasons. For example, the component cannot be started because a hard referenced component is not active or an exception during the startup has occurred, etc.

In one embodiment, the active state 1402 may have different meanings for different components. For example, an interface component having an active state may mean that there is a service in an active state that provides this interface. A library component having a loaded state and an active state behaves substantially the same. A service component is in an active state when the system has successfully called its "start" method.

In one embodiment, components have eight different actions for moving between states: deploy, resolve, load, start, stop, unload, unresolve, undeploy. There are three more operations that are in fact derived from the ones listed above: resolve failed, start failed, and deactivate. The resolve failed operation changes the component state from deployed to non-resolved. This happens when the resolve operation fails. Operation start failed changes the component state from loaded to non-active. This happens when the start step fails. The deactivate operation is transparent for components. It just moves a component from the non-activated state to loaded state when needed, such as, for example, preparing a component to be unloaded.

In one embodiment, all components from one type may be required to have unique names. But it is possible for components of different types (e.g., interface and service) to have the same names. During deployment of a new component, the system checks whether its name has already been used. After deployment, the component becomes a part of the system. The system registers the component in a persistent registry.

According to one embodiment, during resolving, the enterprise engine checks whether all required components (according to reference definitions between the components) are available in the system and if it is possible to resolve them. In a particular embodiment, the following algorithm for resolving a component may be implemented:

The system iterates through all components. For each component, if all components, referenced by the current one are deployed in the system, the current component is marked as temporarily resolved. Otherwise, it is marked as non-resolved.

The system iterates through all non-resolved components. If a non-resolved component is referenced by a temporarily resolved component, this temporarily resolved component is marked as non-resolved.

All components that are marked as temporarily resolved are changed to the resolved state.

At the end the system has marked all components as resolved or non-resolved. The system then prepares class loaders for components.

According to one embodiment, there is a difference between preparing a class loader for a component (which is performed in the above operations) and registering this class loader in the system, which is performed during loading the components. In fact, all components resolved in the above operations are loaded during the loading operations. The system marks all libraries as active.

According to one embodiment, most of the service components are started asynchronously. During starting service components, the system checks the hard references of each service. In one embodiment, if all services and interfaces described in the hard references of the current service are active, the system calls the start method of the current service. If this call ends successfully, the system marks this service and all the interfaces provided by the service as active. If the call fails, the system marks this service as non-active and all the interfaces provided by the service are also marked as non-active.

In an alternative embodiment, if there is a service or an interface that is in a non-active state and the current service has a hard reference to it, the current service is marked as non-active and all the interfaces provided by the service are also marked as non-active. In another embodiment, if there is a service that is neither in active nor in non-active state and the current service has a hard reference to it, this algorithm is applied to this service to distinguish its state. Then a check for the current service is done again.

In a further embodiment, where there is an interface that is neither in an active state nor in a non-active state and the current service has a hard reference to it, if this interface has a service that provides it and this service is loaded, the algorithm is applied to this service to distinguish its state. If this interface does not have a service that provides it or this service is non-resolved, the interface is marked as non-active. The current service with all the interfaces provided by it are also marked as non-active. At the end, all services will be in an active or in a non-active state. The interfaces that are neither in an active nor in a non-active state are marked as non-active.

When stopping a service component, according to one embodiment, all services that have a hard reference to this service or to the interfaces provided by the service are stopped and a synchronous event is sent. The purpose of this event is to provide a way for other services that have a weak reference to this one to release the references to it. Thereafter, the system calls the service stop method and a stop event is sent.

During unloading a component, according to one embodiment, all components that have weak reference to this component have to be unloaded. Some of them may have to be stopped before being unloaded. Thereafter, the following procedure for unloading may be performed:

A synchronous event is sent. This is useful for components that have a notify reference to the current one. By handling this event, they can prevent future usage of classes provided by the current component.

The system removes the component loader from the class loader registry. If there is a cycling reference between the components, it is possible that their class loaders are removed later when removing the last one from the cycle.

The system sends a component-unloaded event.

In one embodiment, to unresolve a component, the system marks all other components that have weak or hard references to this component as non-resolved. Other operations may be performed.

In one embodiment, the enterprise engine includes a service container that is a subsystem that acts as a container for pluggable components. This subsystem is part of the system kernel. To start pluggable components, according to one embodiment, the service container performs the following operations:

Reads all the components data from the persistent storage (e.g., databases).

Checks the data integrity (e.g., whether there are defined components with equal names, has each component correct descriptor, etc.).

Resolves the components.

Checks the non-resolved components if there is among them a component defined as part of the core. If there is at least one such component, the service container stops the process of the components and returns an error. This causes immediate exit out of the system.

Creates the class loader structure for the components.

Starts services.

Checks the non-started services if there is among them a service defined as part of the core. If there is at least one such service, the service container stops all components, unloads them, and returns an error. This causes immediate exit out of the system.

When the Service Container stops the pluggable components it stops all services and thereafter removes the class loaders of all components.

Exemplary Data Processing System

Figure 15:
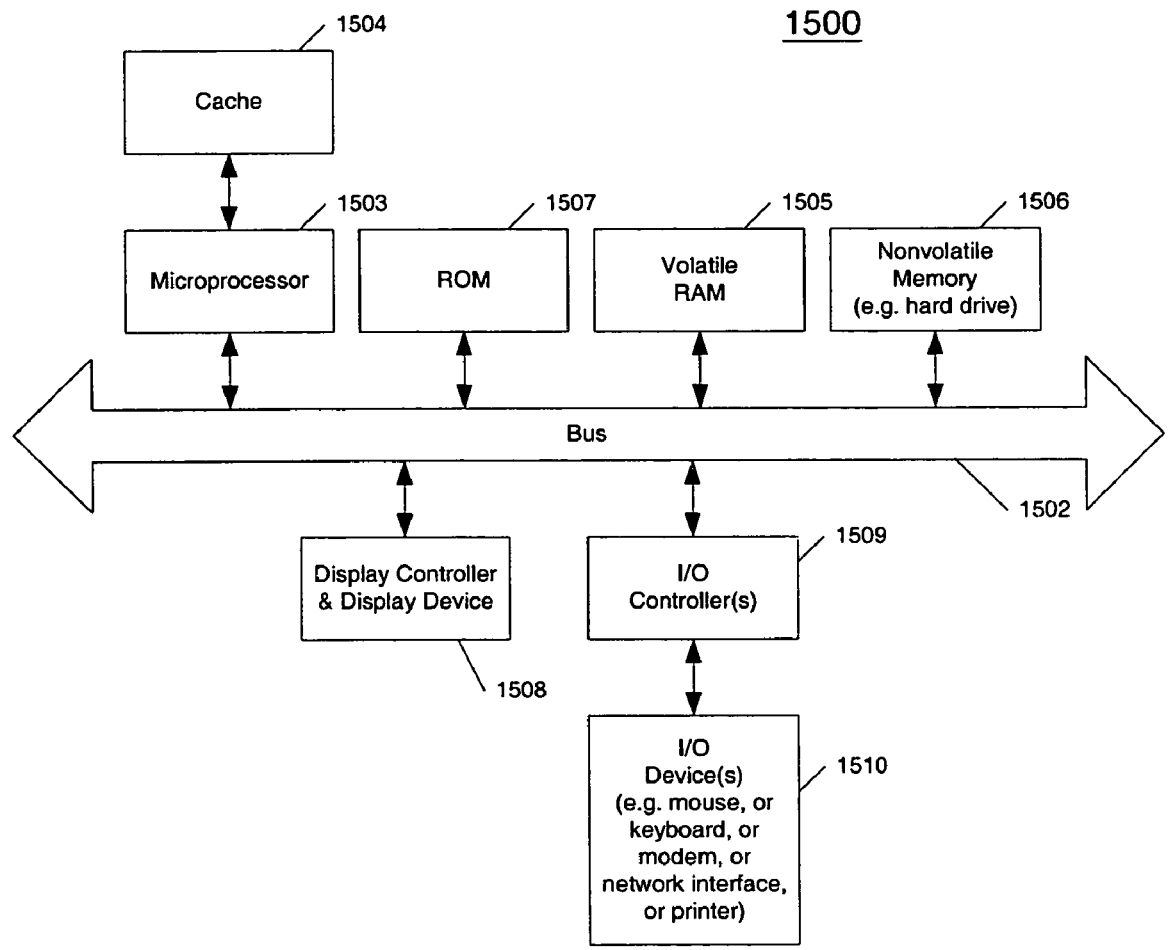
FIG. 15 is a block diagram of a data processing system which may be used with one embodiment of the invention.

FIG. 15 is a block diagram of a data processing system which may be used with one embodiment of the invention. For example, the exemplary system 1500 shown in FIG. 15 may be used as an enterprise computing engine, a server, or a client, such as, client 1101, dispatch node 1102, servers 1104-1106, or a database engine 1107 of FIG. 11. The exemplary system 1500 may also be used as a development system for developing an enterprise application. For example, the exemplary system 1500 may utilize an application having the exemplary GUIs shown in FIGS. 1-9 to develop and/or deploy an enterprise application.

Note that while FIG. 15 illustrates various components of a computer system, it is not intended to represent any particular architecture or manner of interconnecting the components, as such details are not germane to the present invention. It will also be appreciated that network computers, handheld computers, cell phones, and other data processing systems which have fewer components or perhaps more components may also be used with the present invention. The computer system of FIG. 15 may, for example, be a J2EE® engine or a NET® framework engine.

As shown in FIG. 15, the computer system 1500, which is a form of a data processing system, includes a bus 1502 which is coupled to a microprocessor 1503 and a ROM 1507, a volatile RAM 1505, and a non-volatile memory 1506. The microprocessor 1503, which may be a PowerPC G3® or PowerPC G4® microprocessor from MOTOROLA, Inc. or IBM, is coupled to cache memory 1504 as shown in the example of FIG. 15. Alternatively, the microprocessor 1503 may be a Pentium® processor of a Pentium® processor family from INTEL Corporation.

The bus 1502 interconnects these various components together and also interconnects these components 1503, 1507, 1505, and 1506 to a display controller and display device 1508, as well as to input/output (I/O) devices 1510, which may be mice, keyboards, modems, network interfaces, printers, and other devices which are well-known in the art. Typically, the input/output devices 1510 are coupled to the system through input/output controllers 1509.

The volatile RAM 1505 is typically implemented as dynamic RAM (DRAM) which requires power continuously in order to refresh or maintain the data in the memory. The non-volatile memory 1506 is typically a magnetic hard drive, a magnetic optical drive, an optical drive, or a DVD (Digital Video Disk) RAM or other type of memory system which maintains data even after power is removed from the system. Typically the non-volatile memory will also be a random access memory, although this is not required. While FIG. 15 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 1502 may include one or more buses connected to each other through various bridges, controllers, and/or adapters, as is well-known in the art. In one embodiment, the I/O controller 1509 includes a USB (Universal Serial Bus) adapter for controlling USB peripherals or an IEEE (Institute of Electrical and Electronics Engineers) 1394 (FireWire) adapter for controlling IEEE 1394 compatible devices.

Thus, methods and apparatuses for providing a user interface for deploying an enterprise application have been described herein. In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A graphical user interface (GUI) system for developing an enterprise application, the GUI system comprising: a processor; a memory coupled to the processor to store instructions that cause the processor to perform GUI operations, the memory having at least two enterprise system components including a first component and a second component, the first component being associated with a first execution state, the second component being associated with a second execution state, the first component being loaded into the memory by a first class loader, the second component being loaded into the memory by a second class loader, and the memory having a link from the first class loader to the second class loader; and a display device coupled to the processor to display a first window and a second window, the first window including a graphical representation of the first component, the second window presenting one or more properties associated with the first component when the graphical representation is activated, the second window including a reference field associated with the one or more properties to display a dependency relationship with the second component, the dependency relationship being associated with a set of constraints between the first execution state and the second execution state, the dependency relationship including an indication indicating a strength of the dependency relationship comprising a strong dependency relationship or a weak dependency relationship, wherein the strong dependency relationship includes sharing classes and runtime objects and is associated with a first set of constraints, wherein the weak dependency relationship includes sharing classes and is associated with a second set of constraints, wherein the first set of constraints has a first number of constraints, wherein the second set of constraints has a second number of constraints, wherein the first number of constraints is greater than the second number of constraints, wherein the first set of constraints includes at least one constraint of the second set of constraints, wherein the at least one constraint of the second set of constraints is used to determine existence of the second component, and wherein the link from the first class loader to the second class loader is established if the second component exists in view of the at least one constraint.

2. The GUI system of claim 1, wherein the reference field comprises a name field and a type field to specify a name and type of the second component, and a strength field to specify the strength of the dependency relationship between the first and second component.

3. The GUI system of claim 2, wherein the reference field further comprises: an add button to add the second component into the reference field; a remove button to remove the second component from the reference field; and an edit button to edit the name, type, and strength of the dependency relationship with respect to the second component.

4. The GUI system of claim 1, wherein the set of constraints includes a first level constraint and a second level constraint, wherein with the first level constraint, if the first execution state is of a loaded state, the second execution state is of the loaded state, and wherein the first component uses one or more classes of the second component.

5. The GUI system of claim 4, wherein with the second level constraint, if the first component is of an active state, the second execution state is of the active state, and wherein the first component uses the one or more classes and one or more runtime objects of the second component.

6. The GUI system of claim 5, wherein with the second level constraint, if the second execution state changes from a loaded state to an unloaded state as the second component is unloaded, the first execution state changes from the loaded state to the unloaded state to unload the first component.

7. The GUI system of claim 1, wherein the second window further comprises a version field to specify one or more versions of the first component including at least one of a major version, a minor version, and a micro version.

8. The GUI system of claim 7, wherein the second window further comprises a description field to provide a description of the first component.

9. The GUI system of claim 8, wherein the second window further comprises:
   a provider field to specify a name of a provider that provides the first component;
   a component name field to specify a name of the first component;
   a display name field to specify a display name associated with the first component; and
   a group name field to specify a group name where the first component is a member.

10. The GUI system of claim 1, wherein the first component is a server component selected from the group consisting of a library, an interface, and a service.

11. The GUI system of claim 1, wherein the memory further comprises a control to deploy the first component, wherein the control is activated to display the first window to display the graphical representation of the first component.

12. The GUI system of claim 1, wherein the first window further displays a graphical representation of a deployment package for deploying one or more components including the first component.

13. The GUI system of claim 12, wherein the display device further displays a third window to display one or more components within the deployment package when the graphical representation of the deployable package is activated. wherein the third window includes a package path field to specify a location of the deployment package and a mapping field to map the deployment package to a representation name.

14. The GUI system of claim 13, wherein the third window further comprises:
   an add button to add one or more components into the deployment package;
   a browse button to browse for a component suitable to be added by the add button; and
   a remove button to remove one or more components from the deployment package.

15. A method for developing an enterprise application, the method comprising: displaying a graphical representation of a first component of at least two enterprise system components in a first window, the first component being associated with a first execution state, the second component being associated with a second execution state, the first component being loaded by a first class loader, the second component being loaded by a second class loader; and in response to an input of an activation of the graphical representation, displaying one or more properties of the first component in a second window, wherein the second window presents a reference field associated with the one or more properties to display a dependency relationship with a second component, the dependency relationship being associated with a set of constraints between the first execution state and the second execution state, the dependency relationship including an indication indicating a strength of the dependency relationship comprising a strong dependency relationship or a weak dependency relationship, wherein the strong dependency relationship includes sharing classes and runtime objects and is associated with a first set of constraints, wherein the weak dependency relationship includes sharing classes and is associated with a second set of constraints, wherein the first set of constraints has a first number of constraints, wherein the second set of constraints has a second number of constraints, wherein the first number of constraints is greater than the second number of constraints, wherein the first set of constraints includes at least one constraint of the second set of constraints, wherein the at least one constraint of the second set of constraints is used to determine existence of the second component, and wherein a link from the first class loader to the second class loader is established if the second component exists in view of the at least one constraint.

16. The method of claim 15, further comprising: specifying a name of the second component in a name field of the reference field; specifying a type of the second component in a type field of the reference field; and specifying a strength of the second component in a strength field of the reference field to specify the strength of the dependency relationship between the first and second component.

17. The method of claim 15, wherein the set of constraints includes a first level constraint and a second level constraint, wherein with the first level constraint, if the first execution state is of a loaded state, the second execution state is of the loaded state, and wherein the first uses one or more classes of the second component.

18. The method of claim 17, wherein with the second level constraint, if the first component is of an active state, the second execution state is of the active state, and wherein the first component uses the one or more classes and one or more runtime objects of the second component.

19. The method of claim 18, wherein with the second level constraint, if the second execution state changes from a loaded state to an unloaded state as the second component is unloaded, the first execution state changes from the loaded state to the unloaded state to unload the first component.

20. The method of claim 15, wherein the second window further comprises a version field to specify one or more versions of the first component including at least one of a major version, a minor version, and a micro version.

21. The method of claim 20, further comprising providing a description of the first component within the second window.

22. The method of claim 21, wherein the second window further comprises:
   a provider field to specify a name of a provider that provides the first component;
   a component name field to specify a name of the first component;
   a display name field to specify a display name associated with the first component; and a group name field to specify a group name where the first component is a member.

23. The method of claim 15, wherein the first component is a server component selected from the group consisting of a library, an interface, and a service.

24. The method of claim 15, further comprising displaying a graphical representation of a deployment package in the first window for deploying one or more components including the first component.

25. The method of claim 24, further comprising displaying a third window one or more components within the deployment package when the graphical representation of the deployable package is activated, wherein the third window includes a package path field to specify a location of the deployment package and a mapping field to map the deployment package to a representation name.

26. The method of claim 25, wherein the third window further comprises:
 an add button to add one or more components into the deployment package:
 a browse button to browse for a component suitable to be added by the add button; and
 a remove button to remove one or more components from the deployment package.

27. A machine-readable storage medium having executable code to cause a machine to perform a method, the method comprising: displaying a graphical representation of a first component in a first window, the first component being associated with a first execution state, the first component being loaded by a first class loader; and in response to an input of an activation of the graphical representation, displaying one or more properties of the first component in a second window, wherein the second window presents a reference field associated with the one or more properties to display a dependency relationship with a second component being associated with a second execution state, the second component being loaded by a second class loader, the dependency relationship being associated with a set of constraints between the first execution state and the second execution state, the dependency relationship including an indication indicating strength of the dependency relationship comprising a strong dependency relationship or a weak dependency relationship, wherein the strong dependency relationship includes sharing classes and runtime objects and is associated with a first set of constraints, wherein the weak dependency relationship includes sharing classes and is associated with a second set of constraints, wherein the first set of constraints has a first number of constraints, wherein the second set of constraints has a second number of constraints, wherein the first number of constraints is greater than the second number of constraints, wherein the first set of constraints includes at least one constraint of the second set of constraints, wherein the at least one constraint of the second set of constraints is used to determine existence of the second component, and wherein a link from the first class loader to the second class loader is established if the second component exists in view of the at least one constraint.

28. A data processing system, comprising: a processor; a memory coupled to the processor; and a process, when executed from the memory, causes the processor to display a graphical representation of a first component in a first window, the first component being associated with a first execution state, the first component being loaded by a first class loader, in response to an input of an activation of the graphical representation, display one or more properties of the first component in a second window, and wherein the second window presents a reference field associated with the one or more properties to display a dependency relationship with a second component being associated with a second execution state, the second component being loaded by a second class loader, the dependency relationship being associated with a set of constraints between the first execution state and the second execution state, the dependency relationship including an indication indicating strength of the dependency relationship comprising a strong dependency relationship or a weak dependency relationship, wherein the strong dependency relationship includes sharing classes and runtime objects and is associated with a first set of constraints, wherein the weak dependency relationship includes sharing classes and is associated with a second set of constraints, wherein the first set of constraints has a first number of constraints, wherein the second set of constraints has a second number of constraints, wherein the first number of constraints is greater than the second number of constraints, wherein the first set of constraints includes at least one constraint of the second set of constraints, wherein the at least one constraint of the second set of constraints is used to determine existence of the second component, and wherein a link from the first class loader to the second class loader is established if the second component exists in view of the at least one constraint.

* * * * *